(12) United States Patent
Drapes et al.

(10) Patent No.: US 9,149,404 B2
(45) Date of Patent: Oct. 6, 2015

(54) SLIDING TRACK AND PIVOT MOUNTING SYSTEM FOR DISPLAYS ON ANESTHESIA MACHINES

(71) Applicant: Spacelabs Healthcare LLC, Snoqualmie, WA (US)

(72) Inventors: Brian E. Drapes, Fort Atkinson, WI (US); Zeng Xi, Suzhou (CN); Ronald L. Tobia, Sun Prairie, WI (US); Bruce Dammann, Middleton, WI (US); Cory Boudreau, Madison, WI (US)

(73) Assignee: Spacelabs Healthcare LLC, Snoqualmie, WA (US)

( * ) Notice: Subject to any disclaimer, the term of this patent is extended or adjusted under 35 U.S.C. 154(b) by 0 days.

(21) Appl. No.: 14/558,587

(22) Filed: Dec. 2, 2014

(65) Prior Publication Data

US 2015/0202105 A1 Jul. 23, 2015

Related U.S. Application Data

(63) Continuation of application No. 13/329,259, filed on Dec. 17, 2011, now Pat. No. 9,022,492.

(60) Provisional application No. 61/424,298, filed on Dec. 17, 2010.

(51) Int. Cl.
*A47B 46/00* (2006.01)
*A47B 49/00* (2006.01)
*A47B 97/00* (2006.01)
*A47B 5/00* (2006.01)
(Continued)

(52) U.S. Cl.
CPC ............... *A61G 12/00* (2013.01); *A47B 81/00* (2013.01); *A47B 81/06* (2013.01)

(58) Field of Classification Search
CPC .......... G01F 1/22; G01F 23/64; A61M 16/01; A61M 2209/082; A61M 2209/084; A61M 2205/50; A61M 2205/17; A61M 2205/502; A61M 2205/52; A61M 2205/505; A61M 1/14; A61B 8/00; A61B 8/4405; A61B 8/462; A61B 8/08; A61B 19/0248; A61B 19/0256; A61B 19/52; A61B 2017/00017; A61B 2017/00057; A61B 2017/00199; A61B 2017/00482; A61B 2017/00977; A61G 12/00; A47B 81/00; A47B 81/06; G01S 15/899; G01S 7/52082; G01S 7/52084; G01S 7/520583
USPC ........ 312/7.2, 249.8, 249.11; 280/651, 47.34, 280/47.35, 79.11; 248/917–920; 361/679.41–679.44
See application file for complete search history.

(56) References Cited

U.S. PATENT DOCUMENTS 7,593,217 B2 * 9/2009 Shahrokhi ................ 361/679.01
2002/0194792 A1 * 12/2002 Feldpausch et al. ........... 52/36.1

*Primary Examiner* — Daniel J Troy
*Assistant Examiner* — Andrew Roersma
(74) *Attorney, Agent, or Firm* — Novel IP

(57) ABSTRACT

An anesthesia workstation includes a sliding track system attached to the front of the anesthesia workstation for the mounting of one or more displays. The displays are horizontally slidable along the front of the anesthesia workstation along the sliding track. In addition, the sliding track system includes pivot points which enable outward pivoting of the displays up to 90 degrees. Sliding and pivoting of the displays is possible both independently and simultaneously. The sliding track system allows the anesthetist to slide and pivot the displays across the front of the workstation along the length of the track to the most preferable viewing position. Additional storage space is positioned within the anesthesia workstation behind the displays and becomes exposed and accessible when the displays are manipulated via the sliding track system.

20 Claims, 20 Drawing Sheets

(51) Int. Cl.
*A47B 81/06* (2006.01)
*B62B 3/00* (2006.01)
*B62B 11/00* (2006.01)
*B62B 1/00* (2006.01)
*B62B 5/00* (2006.01)
*A61G 12/00* (2006.01)
*A47B 81/00* (2006.01)

SLIDING TRACK AND PIVOT MOUNTING SYSTEM FOR DISPLAYS ON ANESTHESIA MACHINES

CROSS-REFERENCE

The present application is a continuation application of U.S. patent application Ser. No. 13/329,259, entitled "Sliding Track and Pivot Mounting System for Displays on Anesthesia Machines" and filed on Dec. 17, 2011, which relies on U.S. Provisional Patent Application No. 61/424,298, of the same title and filed on Dec. 17, 2010, for priority. Both of said applications are herein incorporated by reference in their entirety.

FIELD

The present specification relates generally to anesthesia systems for use in operating rooms and intensive care settings. More particularly, the present specification relates to a sliding track and pivot system used for mounting displays on an anesthesia machine.

BACKGROUND

Anesthesia systems are used in operating rooms and intensive care units to supply a continuous and accurate mixture of medical gases and anesthetic agents to patients in order to induce loss of physical sensation, particularly pain, and to keep the patients sedated during procedures and in critical situations. Typical anesthesia systems include an anesthesia machine connected to hospital piped gases. Anesthesia machines are mounted on wheels and usually comprise a ventilator, one or more vaporizers for addition of volatile anesthetic agents, a suction unit, patient monitoring devices, displays, and a work bench. The machines are typically positioned in proximity to the head of the patient, allowing enough room for surgeons and nurses to operate and maneuver. Anesthesiologists and/or nurse anesthetists stand by the machine at the head of the patient and are able to observe both the patient and the anesthesia machine displays, enabling them to react quickly if an emergency situation arises.

Modern anesthesia machines include one or two displays that can be viewed by the anesthetist. The first display relays information regarding the functionality of the ventilator. A second display is often included and typically relays physiological data regarding the status of the patient obtained from the patient monitoring devices of the anesthesia machine. Current machines typically have their displays mounted in one of two fashions. In the first, the displays are fixed and mounted inboard within the footprint of the machine. This acts to conserve valuable space within the operating room, but offers less than desirable usability for anesthetists facing the patient or away from the center of the machine. It also acts to further clutter the area around the front of the anesthesia machine. The second addresses the usability and clutter issues by utilizing display mount arms. These arms are typically mounted outboard and can be repositioned by the anesthetist to improve visibility and clear the front of the machine. For example, U.S. Pat. No. 6,715,722, assigned to William Alan Roberts, describes a "support structure for mounting equipment to a transportable anesthesia machine having a wheeled frame, said support structure comprising an elongate vertical member adapted to mount the equipment which is to be mounted to the anesthesia machine, said vertical member having an upper end and a lower end; an elongate horizontal member extending perpendicularly from said lower end of said vertical member, said horizontal member having an inboard end attached to said vertical member and having an outboard end; means for securing said horizontal member to the frame of the anesthesia machine so that said vertical member is disposed alongside the anesthesia machine and said support structure moves as a unit with the anesthesia machine when the anesthesia machine is transported, said means for securing including a retaining plate adjustably connected to said horizontal member for movement toward said horizontal member to compressively secure the frame between said retaining plate and said horizontal member; and a vertical foot extending downwardly from said horizontal member in a perpendicular direction, said foot being axially aligned with said vertical member." However, use of these outboard arms also results in increasing the overall footprint of the machine.

Therefore, a need exists for a display mounting system that imparts increased flexibility in display positioning and viewing but does not increase the physical footprint of the anesthesia machine. Such a mounting system will enhance user viewing flexibility, allowing the anesthetist to focus more easily on both the patient and the machine displays, and thereby perform more efficiently.

Additionally, since outboard mounted moveable arms increase the cost of anesthesia machines, an integrated, flexible display mounting system will act not only to keep the machine footprint smaller, but will also keep costs lower when compared to display mount arms.

SUMMARY

In one embodiment, the present specification describes an anesthesia workstation comprising a lower portion and an upper portion, wherein said upper portion comprises a front face, wherein a front cover is fixedly attached to said front face, and wherein said front cover comprises a left side and a right side, wherein said left side comprises at least one mounting hole and said right side comprises a recessed storage area; a first display; a second display; and, a sliding track mounting system, comprising: a left display enclosure, for housing said first display; a right display enclosure, for housing said second display; a center enclosure, for housing a frame assembly; at least one horizontal sliding rail; and, at least one stopper block; wherein said left display enclosure and said right display enclosure connect together to form a unified display enclosure assembly with the center enclosure, for housing said frame assembly; wherein said at least one horizontal sliding rail attaches to said at least one mounting hole in said front cover such that a left end of at least one sliding rail abuts an inside edge of said front cover and a right end of at least one sliding rail is free of obstruction; wherein said frame assembly with attached display enclosure assembly is adapted to slidably attach onto said at least one sliding rail from said unobstructed right end; wherein said at least one stopper block is attached to said front cover proximate said unobstructed right end of said at least one sliding rail such that said frame assembly with attached display enclosure assembly is unable to slide off to the right of said at least one horizontal sliding rail; and, wherein said display enclosure assembly is horizontally slidable from a first position to a second position and wherein said center enclosure further comprises pivoting means, wherein said pivoting means enable pivoting of said left and right display enclosures outward from said front cover.

In another embodiment, the present specification describes a track mounting system for mounting at least one display onto an anesthesia workstation comprising: a left display enclosure, for housing a first display; a right display enclosure, for housing a second display; a center enclosure, for housing a pivoting frame assembly; two horizontal sliding rails; and, two stopper blocks; wherein said anesthesia workstation comprises a lower portion and an upper portion, wherein said upper portion comprises a front face, wherein a front cover is fixedly attached to said front face, and wherein said front cover comprises a left side and a right side, wherein said left side comprises a plurality of mounting holes and said right side comprises a recessed storage area; wherein said left display enclosure and said right display enclosure connect together to form a unified display enclosure assembly with the center enclosure; wherein said at least one horizontal sliding rail attaches to said plurality of mounting holes in said front cover of the anesthesia workstation such that a left end of at least one sliding rail abuts an inside edge of said front cover and a right end of at least one sliding rail is free of obstruction; wherein said frame assembly with attached display enclosure assembly is adapted to slidably attach onto said at least one sliding rail from said unobstructed right end; wherein said at least one stopper block is attached to said front cover proximate said unobstructed right end of said at least one sliding rail such that said frame assembly with attached display enclosure assembly is unable to slide off to the right of said at least one horizontal sliding rail; and, wherein said display enclosure assembly is horizontally slidable from a first position to a second position and wherein said pivoting frame assembly enables pivoting of said left and right display enclosures outward from said front cover.

In one embodiment, said display enclosure assembly, when in said first position, is slid to its rightmost position along said horizontal sliding rails. In one embodiment, said display enclosure assembly, when in said second position, is slid to its leftmost position along said horizontal sliding rails. In one embodiment, said display enclosure assembly is horizontally slidable within a range of 18 inches from said first position to said second position and any position therebetween.

In one embodiment, said left display enclosure is pivotable from a first position to a second position and any position therebetween, wherein said first position is at 0 degrees and parallel to the front face of said anesthesia workstation and said second position is at 90 degrees, facing the right side of said anesthesia workstation, and perpendicular to the front face of said anesthesia workstation. In one embodiment, said right display enclosure is pivotable from a first position to a second position and any position therebetween, wherein said first position is at 0 degrees and parallel to the front face of said anesthesia workstation and said second position is at 90 degrees, facing the left side of said anesthesia workstation, and perpendicular to the front face of said anesthesia workstation.

In one embodiment, said recessed storage area is rectangular in shape and exposed and accessible when said display enclosure assembly is slid to said second position. Further, said recessed, rectangular shaped storage area is exposed and accessible when said right display enclosure is pivoted to said second position.

In one embodiment, the horizontal sliding of the display enclosure assembly and pivoting of the left and right display enclosures can be performed independently or simultaneously.

In yet another embodiment, the present specification describes an anesthesia workstation, comprising: a housing comprising a top portion and a bottom portion, wherein said bottom portion comprises a horizontal planar surface having a height in the range of 2 feet to 4 feet and a plurality of vertical walls for supporting said horizontal planar surface at said height, wherein said top portion comprises a vertical back wall, a vertical left wall, a vertical right wall, and a horizontal top cover, wherein said vertical back wall, said vertical left wall, and said horizontal top cover define a first compartment having an opening defined by four perimeter edges, wherein said vertical back wall, said vertical right wall, and said horizontal top cover define a second compartment having an opening defined by four perimeter edges, and, wherein said first compartment is separated from said second compartment by a wall; a horizontal sliding track attached to one of said four perimeter edges of the first compartment and one of said four perimeter edges of the second compartment; a first mounting bracket adapted to attach to the back of a first display and adapted to slidably attach to said horizontal sliding track, wherein said first mounting bracket is horizontally slidable within said sliding track; and a second mounting bracket adapted to attach to the back of a second display and adapted to slidably attach to said horizontal sliding track, wherein said second mounting bracket is horizontally slidable within said sliding track. In one embodiment, the slidable track is a contiguous structure of a discontinuous structure.

The aforementioned and other embodiments of the present specification shall be described in greater depth in the drawings and detailed description provided below.

BRIEF DESCRIPTION OF THE DRAWINGS

These and other objects and advantages of the present specification will become more fully apparent from the following detailed description when read in conjunction with the accompanying drawings with like reference numerals indicating corresponding parts through-out, wherein.

DETAILED DESCRIPTION

Figure 1:
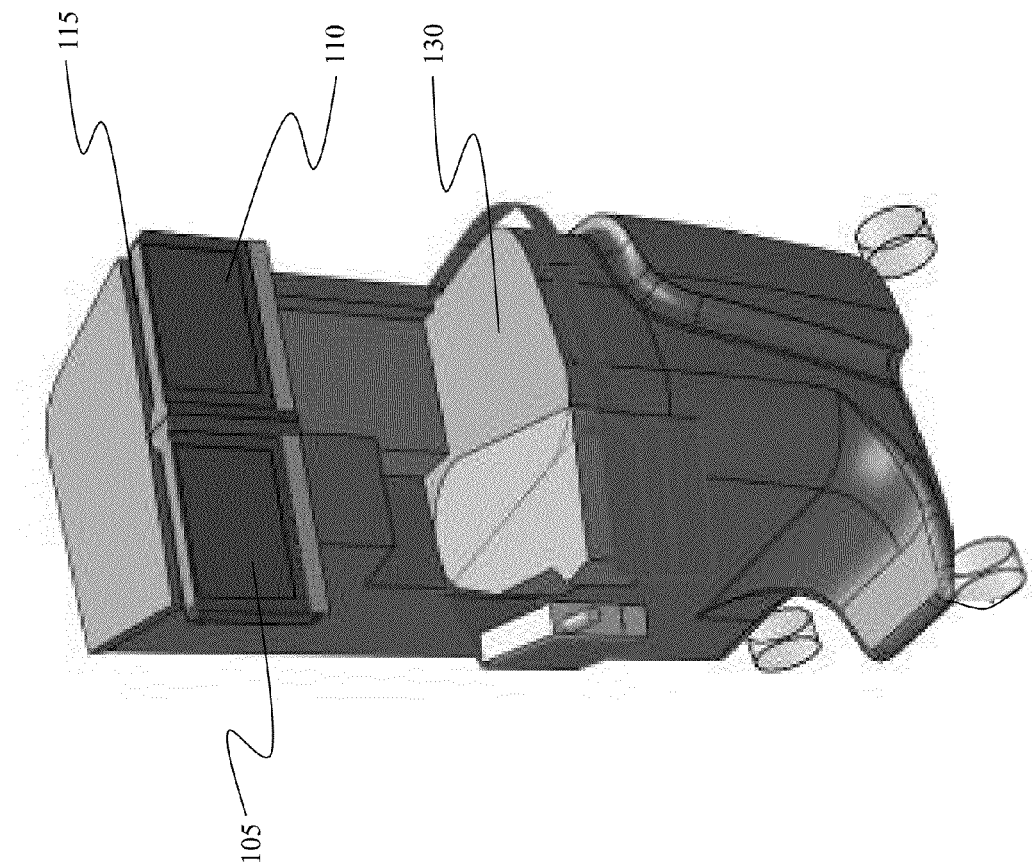
FIG. 1 is an oblique, front view illustration of one embodiment of an anesthesia workstation with two displays mounted on a sliding track, depicting an exemplary configuration of the displays placed in their default position when facing the front of the anesthesia workstation.

In one embodiment, the present specification is directed toward a sliding track system used for mounting one or more displays on an anesthesia machine and its unified housing (hereinafter referred to as "anesthesia workstation"). In one embodiment, a sliding track system is installed on the front of an anesthesia workstation, proximate to the top edge of said machine housing. In one embodiment, the sliding track system is capable of sliding horizontally across the front of the anesthesia workstation. In one embodiment, a single display is mounted to the sliding track system, allowing for horizontal movement of said display across the front of the anesthesia workstation. The display is used to relay information regarding the functionality of the ventilator and other components of the anesthesia workstation. In another embodiment, two displays are mounted to the sliding track system, allowing for horizontal movement of both displays across the front of the anesthesia workstation. In one embodiment, a right display is used to relay information regarding the functionality of the ventilator and other components of the anesthesia workstation. In one embodiment, a left display is used to relay information regarding the status of the patient, based upon values obtained through measurements from the patient monitoring devices of the anesthesia workstation. In one embodiment, the information presented on the displays is interchangeable between the two displays. The sliding track system allows the anesthetist to slide and position the display(s) across the front of the machine along the length of the track to the most preferable viewing position.

In one embodiment, in addition to or independently from sliding the displays horizontally across the front of the anesthesia workstation, the anesthetist can improve viewing by horizontally pivoting the displays outward from the front of the machine. In one embodiment, the sliding track system of the present specification includes pivot points where the display is mounted to the track to allow for horizontal pivoting of the display outward from the anesthesia workstation. In one embodiment, in which only one display is mounted, the display is attached to the track on said display's left side, when facing the front of the machine. This allows for the right edge of the display to be pivoted outward from the front of the anesthesia workstation. In another embodiment, in which only one display is mounted, the display is attached to the track on said display's right side, when facing the front of the machine. This allows for the left edge of the display to be pivoted outward from the front of the anesthesia workstation. The anesthetist can pivot the display to a desirable position to improve visibility. In one embodiment, the display can be pivoted up to 90 degrees, resulting in the display being perpendicular to the front of the anesthesia workstation when in a fully pivoted configuration. In another embodiment, in which two displays are mounted, the left display is attached to the track on said displays right side when facing the machine. The right display is attached to the track on said displays' left side when facing the machine. This allows for the left edge of the left display to be pivoted outward from the front of the anesthesia workstation and the right edge of the right display to be pivoted outward from the front of the anesthesia workstation. In one embodiment, both displays can be independently pivoted up to an angle of 90 degrees away from the front of the anesthesia workstation. This functionality allows the anesthetist to create a "cockpit" of display positioning at many points along the front of the machine where the anesthetist may choose to situate him or herself. In one embodiment, both displays can be pivoted independently from the sliding motion.

The sliding track system and pivoting mechanism of the present specification not only improve visibility and lessen clutter by increasing display positioning flexibility, but also provide the anesthetist with more storage area by making the previously inaccessible space behind the displays available. In one embodiment, in which only one display is mounted, a rectangular storage "locker" or "cubby" is positioned behind the display. In another embodiment, in which two displays are mounted, a rectangular storage "locker" or "cubby" is positioned behind only the left display. In another embodiment, in which two displays are mounted, a rectangular storage "locker" or "cubby" is positioned behind only the right display. In another embodiment, in which two displays are mounted, a rectangular storage "locker" or "cubby" is positioned behind each display. The storage area is accessed by sliding the display(s) horizontally to clear the storage area, or by swinging either display open temporarily in the same fashion as a door. Once the storage area has been accessed, the display(s) are returned to their optimal viewing position. These "lockers" or "cubbies" provide the anesthetist with additional storage area that is easily accessed without sacrificing prime front viewing area to a fixed door or permanent opening.

The sliding track system and pivoting displays of the present specification provide enhanced display viewing, lessen clutter, and provide additional storage for all anesthesia systems and for intensive care unit (ICU) ventilator "carestation" systems that combine physiologic monitoring on multiple displays. The present specification also provides particular value to smaller, lower cost systems as it maintains a smaller anesthesia workstation footprint and can be implemented at a lower cost than a full moveable arm.

The present invention is directed toward multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

FIG. 1 is an oblique front view illustration of one embodiment of an anesthesia workstation 100 with two displays 105, 110 mounted on a sliding track 115, depicting a first configuration with said displays placed in their default position when facing the front of said anesthesia workstation 100. Also depicted is a work surface area 130 for the anesthetist. When initially installed, the displays 105, 110 are positioned at the rightmost position of the sliding track 115. In addition, the displays initially have 0 degrees of pivot and therefore are completely parallel with the front face of the anesthesia workstation 100. In this initial configuration, the anesthetist has the same viewing level of the displays as in the prior art in which the displays are fixed.

Figure 2:
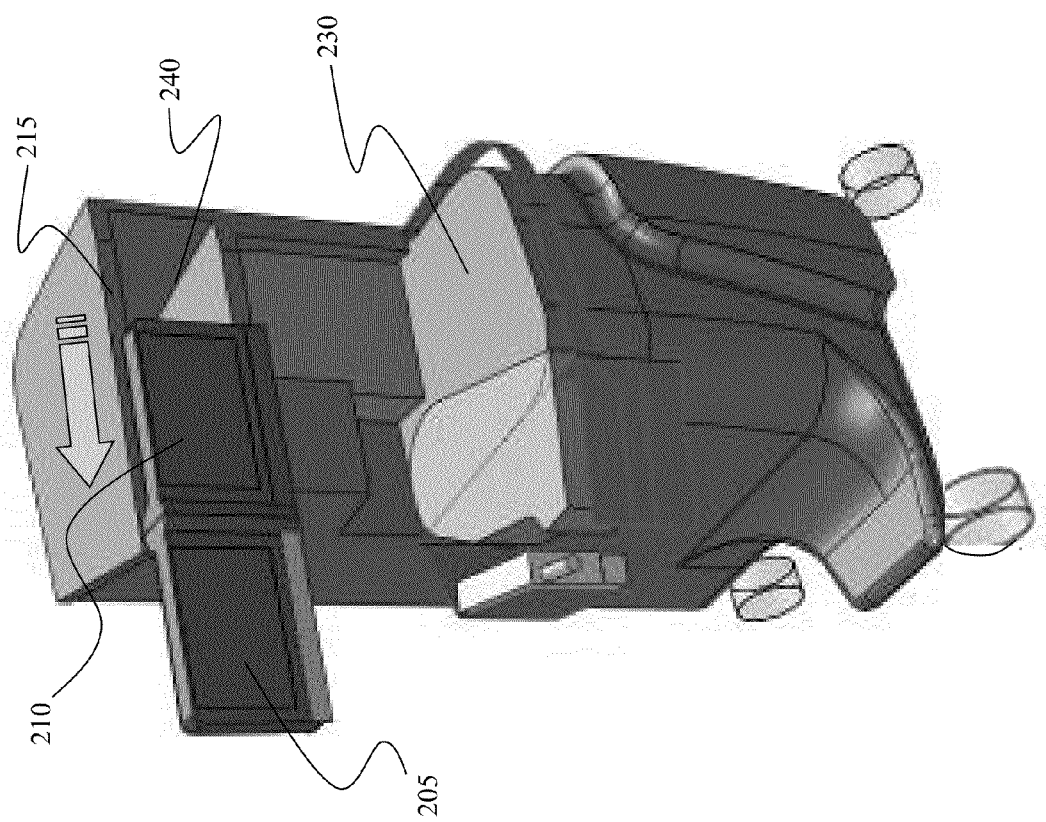
FIG. 2 is an oblique, front view illustration of one embodiment of an anesthesia workstation with two displays mounted on a sliding track, depicting another exemplary configuration of the displays slid to their left-most position when facing the front of the anesthesia workstation.

FIG. 2 is an oblique front view illustration of one embodiment of an anesthesia workstation 200 with two displays 205, 210 mounted on a sliding track 215, depicting a second configuration with said displays 205, 210 slid to their leftmost position when facing the front of said anesthesia workstation 200. In one embodiment, the displays 205, 210 can be sled within a range of 18 inches from their rightmost position to their leftmost position. This display 205, 210 positioning provides the anesthetist with greater viewing flexibility and also exposes the storage cubby 240 previously hidden behind the right display 210. Sliding the displays 205, 210 to the left of the anesthesia workstation 200 positions said displays 205, 210 closer to the head of the patient, allowing the anesthetist to move closer to the patient and to more closely monitor the patient and the displays. The additional storage area provided by the storage cubby 240 expands the capability of the system to be used in the anesthesia area by allowing for storage of necessary accessory equipment and supplies and frees up work surface area 230 to allow the anesthetist to perform more effectively.

Figure 3:
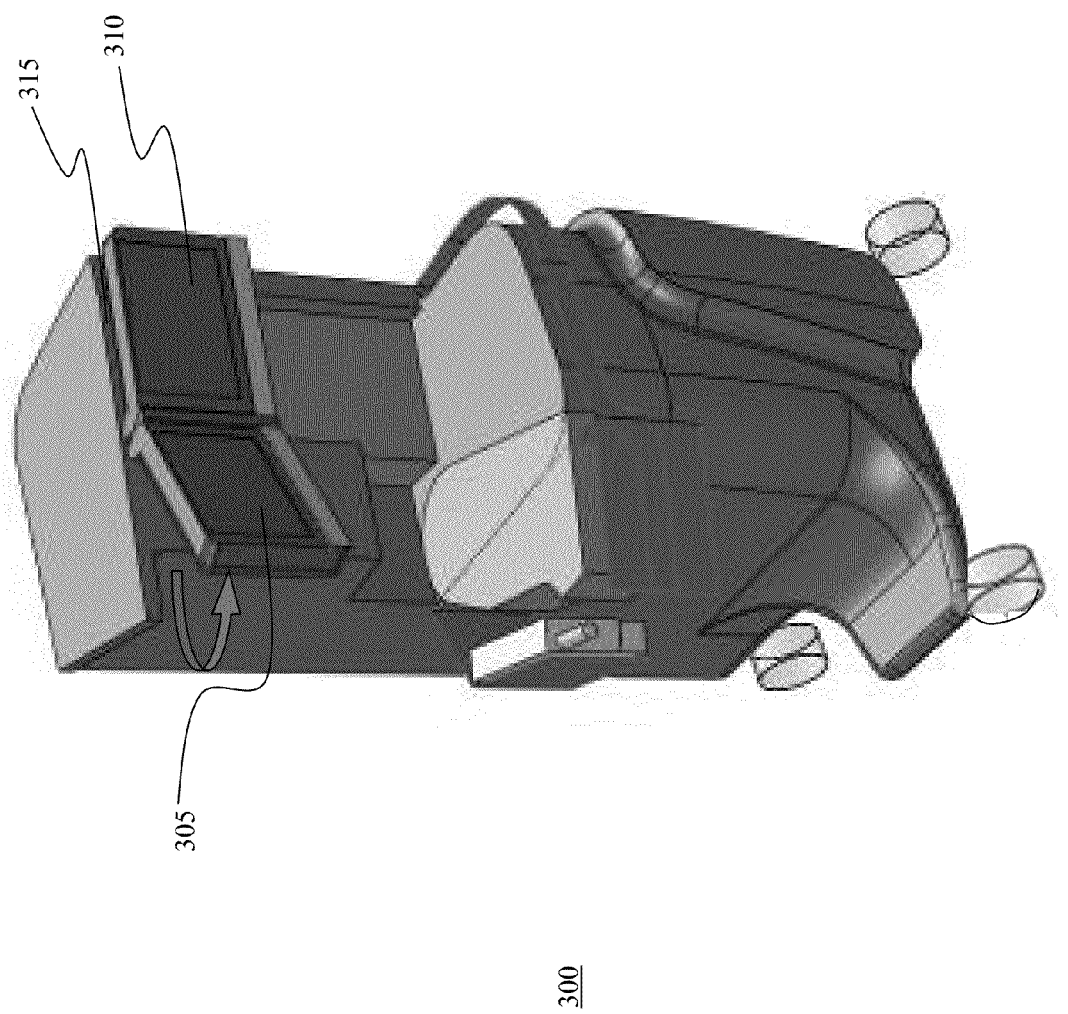
FIG. 3 is an oblique, front view illustration of one embodiment of an anesthesia workstation with two displays mounted on a sliding track, depicting another exemplary configuration with the left side of the left display pivoted partially outward from the anesthesia workstation when facing the front of the anesthesia workstation.

FIG. 3 is an oblique front view illustration of one embodiment of an anesthesia workstation 300 with two displays 305, 310 mounted on a sliding track 315, depicting a third configuration with the left side of the left display 305 pivoted partially outward from said anesthesia workstation 300 when facing the front of said anesthesia workstation 300. In this embodiment, both displays 305, 310 can be pivoted between 0 and 90 degrees outward from the anesthesia workstation 300 to a viewing angle most preferable to the anesthetist. In FIG. 3, the left display 305 is pivoted to an angle somewhere between 0 and 90 degrees outward from the anesthesia workstation 300 and the right display 310 is pivoted to an angle of 0 degrees outward from the anesthesia workstation 300. In other words, the right display 310 remains parallel to the front face of the anesthesia workstation 300. The configuration of the left display 305 pivoted outward from the anesthesia workstation 300 depicted in FIG. 3 allows the anesthetist to face the head of the patient and nearly simultaneously view both the patient and the left display 305.

Figure 4:
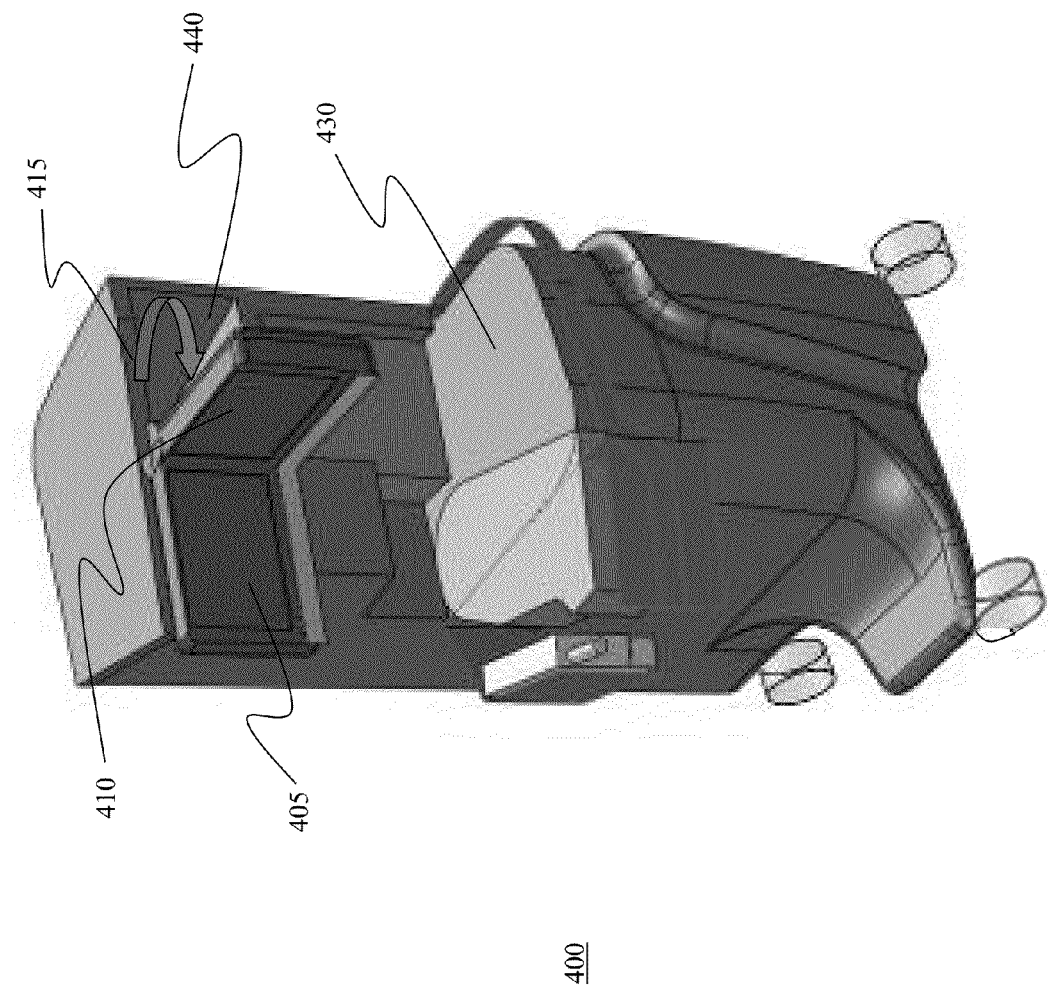
FIG. 4 is an oblique, front view illustration of one embodiment of an anesthesia workstation with two displays mounted on a sliding track, depicting another exemplary configuration with the right side of the right display pivoted completely outward from the anesthesia workstation when facing the front of the anesthesia workstation.

FIG. 4 is an oblique front view illustration of one embodiment of an anesthesia workstation 400 with two displays 405, 410 mounted on a sliding track 415, depicting a fourth configuration with the right side of the right display 410 pivoted completely outward from said anesthesia workstation 400 when facing the front of said anesthesia workstation 400. This pivoting action acts to increase flexibility in viewing and also to completely expose the storage cubby 440 previously hidden behind the right display 410. In this embodiment, the right display 410 is capable of pivoting 90 degrees outward from the anesthesia workstation 400 and acts in the same fashion as a door, allowing the anesthetist access to the storage cubby 440. Again, the presence of the storage cubby 440 provides a location for placing accessory equipment and supplies and frees up space on the work surface area 430, allowing the anesthetist to perform more effectively.

Figure 5:
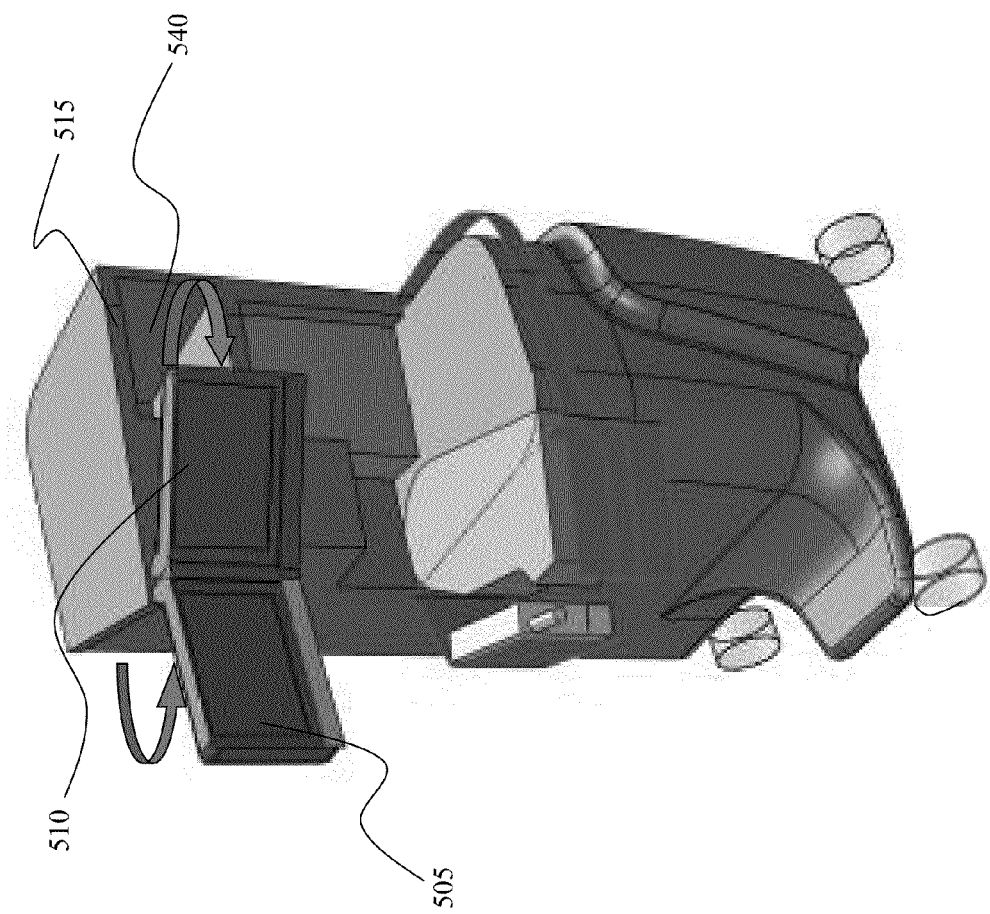
FIG. 5 is an oblique, front view illustration of one embodiment of an anesthesia workstation with two displays mounted on a sliding track, depicting yet another exemplary configuration with said displays slid to their left-most position and pivoted partially outward when facing the front of said anesthesia workstation.

FIG. 5 is an oblique front view illustration of one embodiment of an anesthesia workstation 500 with two displays 505, 510 mounted on a sliding track 515, depicting a fifth configuration with said displays 505, 510 slid to their left-most position and pivoted partially outward when facing the front of said anesthesia workstation 500. This embodiment takes advantage of all aspects of the present specification, providing for movement of the displays 505, 510 both horizontally along and outward from the face of the anesthesia workstation 500, and, exposing the storage cubby 540. The present specification provides the anesthetist with greatly enhanced flexibility with regards to display positioning and access to additional storage unavailable with fixed display systems, while simultaneously maintaining the size of the anesthesia workstations physical footprint which is not possible with outboard display arms.

Figure 6:
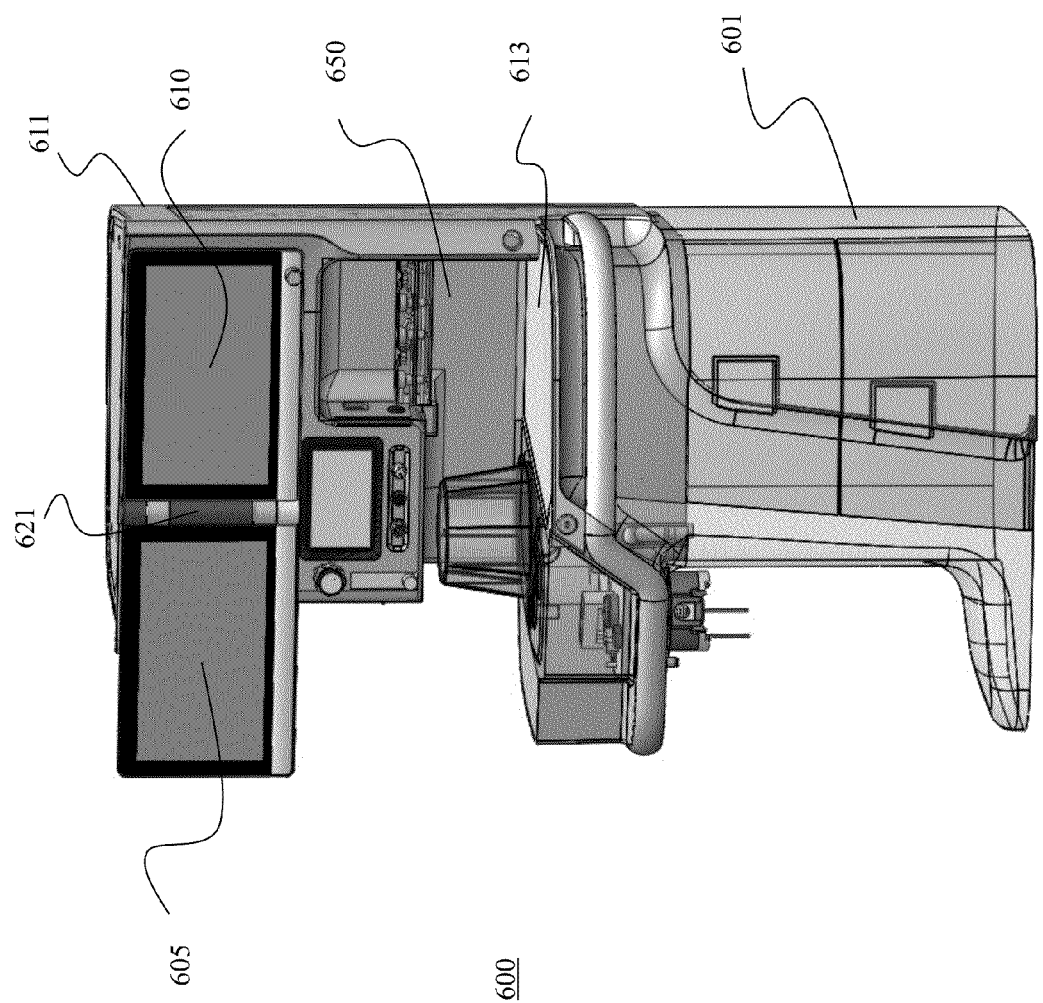
FIG. 6 is a front view illustration of one embodiment of an anesthesia workstation with two displays mounted on a sliding track, depicting a pivoting mechanism enclosure and the two displays placed in their default position when facing the front of the anesthesia workstation.

FIG. 6 is a front view illustration of one embodiment of an anesthesia workstation 600 with two displays 605, 610 mounted on a sliding track, depicting a pivoting mechanism enclosure 621 and the two displays 605, 610 placed in a default position when facing the front of the anesthesia workstation. In one embodiment, the anesthesia workstation comprises a lower portion 601 and an upper portion 611. In one embodiment, a front cover 650 is attached to the front face of the upper portion 611. In one embodiment, the displays 605, 610 are enclosed within display enclosures which act to contain each display and facilitate attachment of the displays to the sliding track system. The sliding track system, in turn, attaches to the front cover 650 of the upper portion 611 of the anesthesia workstation 600. The enclosures fit together in the center, between the two displays 605, 610, to form a pivoting mechanism enclosure 621. The pivoting mechanism enclosure 621 contains the components which allow each display to pivot away from the front face of the anesthesia workstation 600. In one embodiment, a section of the top surface of the lower portion 601 is clear and functions as a workspace 613 for the anesthesiologist.

Figure 7:
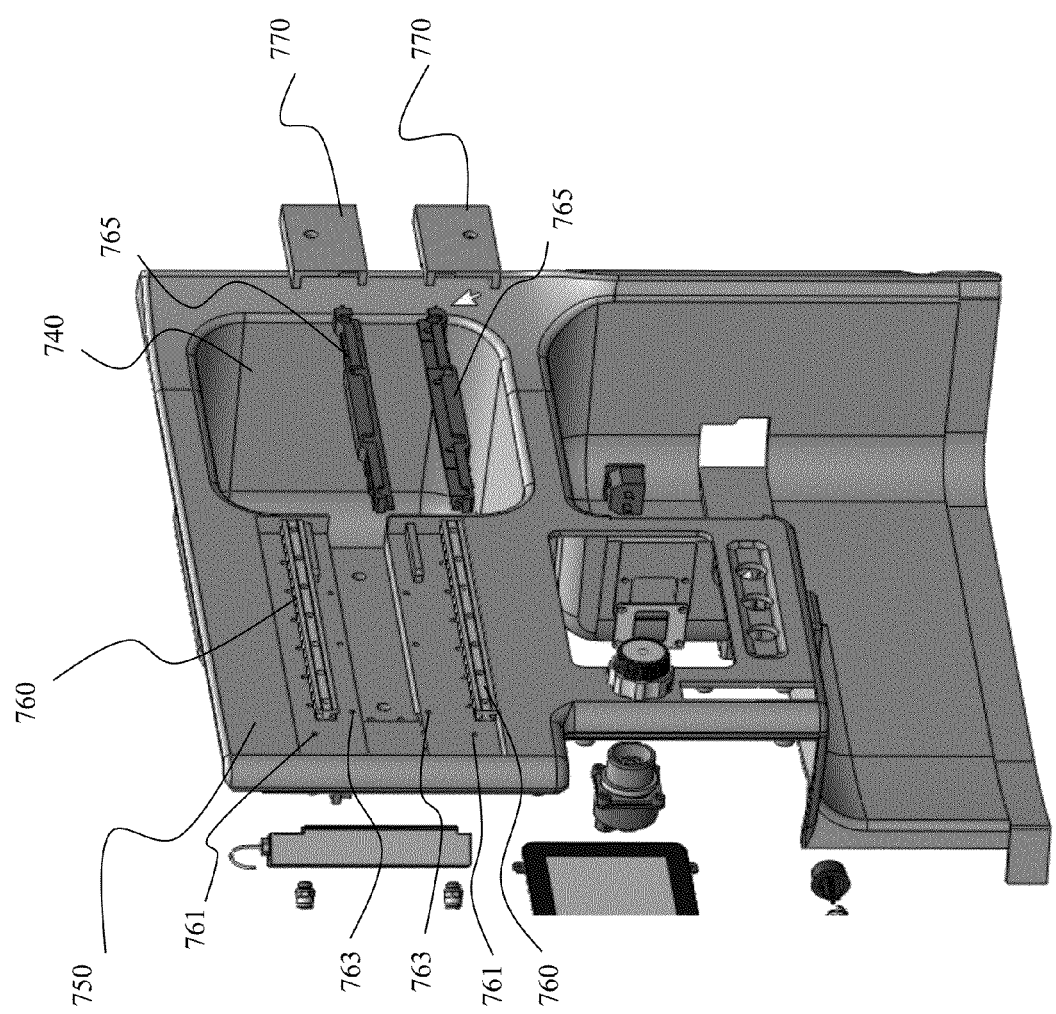
FIG. 7 is an oblique, front view illustration of one embodiment of the front cover of an anesthesia workstation with the displays removed, depicting display rails of the sliding track, optional locating brackets, and slide stopper blocks.

FIG. 7 is an oblique, front view illustration of one embodiment of the front cover 750 of an anesthesia workstation with the displays removed, depicting display rails 760 of the sliding track, optional locating brackets 765, and slide stopper blocks 770. Additional components of the front cover 750 have been removed to assist visualization. In one embodiment, the front cover 750 contains a plurality of mounting holes 761, 763. In one embodiment, a pair of display rails 760 is mounted to the front cover 750 via screws which are inserted through the display rail 760 and into a first set of mounting holes 761. In an optional embodiment, a pair of locating brackets 765 is mounted to the front cover 750 via screws which are inserted through the locating brackets 765 and into a second set of mounting holes 763. In one embodiment, the distance between an upper row and a lower row of the first set of mounting holes 761 is greater than the distance between an upper row and a lower row of the second set of mounting holes 763.

In one embodiment, optional slide stopper blocks 770 are mounted on the front cover 750 via screws and the mounting holes 761 to prevent the displays from sliding off the ends of the sliding track system. In various embodiments, the stopper blocks 770 are mounted proximate the left end of the rails 760 or locating brackets 765, proximate the right end of said rails 760 or locating brackets 765, or proximate both ends of said rails 760 or locating brackets 765. In various embodiments, one stopping block 760 is installed proximate one end of either an upper rail 760 or locating bracket 765 or a lower rail 760 or locating bracket 765, or, two stopping blocks 770 are installed proximate one end of a pair of rails 760 or locating brackets 765, one block 760 proximate the upper rail 760 or locating bracket 765 and one block 770 proximate the lower rail 760 or locating bracket 765. Referring to FIG. 7, the display rails 760 are depicted just to the front of the front cover 750 and the locating brackets 765 and stopping blocks 770 are depicted removed from and in front of the front cover 770. Also depicted is the storage area 740 set into the front cover 750 which is exposed when the right display is either slid leftward or pivoted outward.

In one embodiment, the display rails 760 comprise long, thin rectangular shaped rails with a rectangular shaped depression running along the entire length of the top and bottom sides of each rail. The surfaces of the rails 760 on either side of the depressions are flat along the entire length of each rail 760, allowing the displays to slide freely from a left end to a right end. The stopper blocks 770, when mounted, act to prevent the displays from sliding off either end of the display rails 760 by preventing movement as the pivoting frame assembly (not shown) butts up against the stopping blocks 770. In one embodiment, the locating brackets 765 comprise long, thin rectangular rails with elastic protrusions proximate both a left end and a right end. These protrusions assist in holding the displays in place at specific positions at either end of the sliding track system, as described below with reference to FIGS. 12D and 12E. The stopper blocks 770, when mounted, act to prevent the displays from sliding off either end of the locating brackets 765 by preventing movement as the pivoting frame assembly (not shown) interfaces with and abuts the stopping blocks 770, and, in addition, act with the elastic protrusions of the locating brackets 765 to hold the displays at specific positions at either end of the sliding track system.

Figure 8:
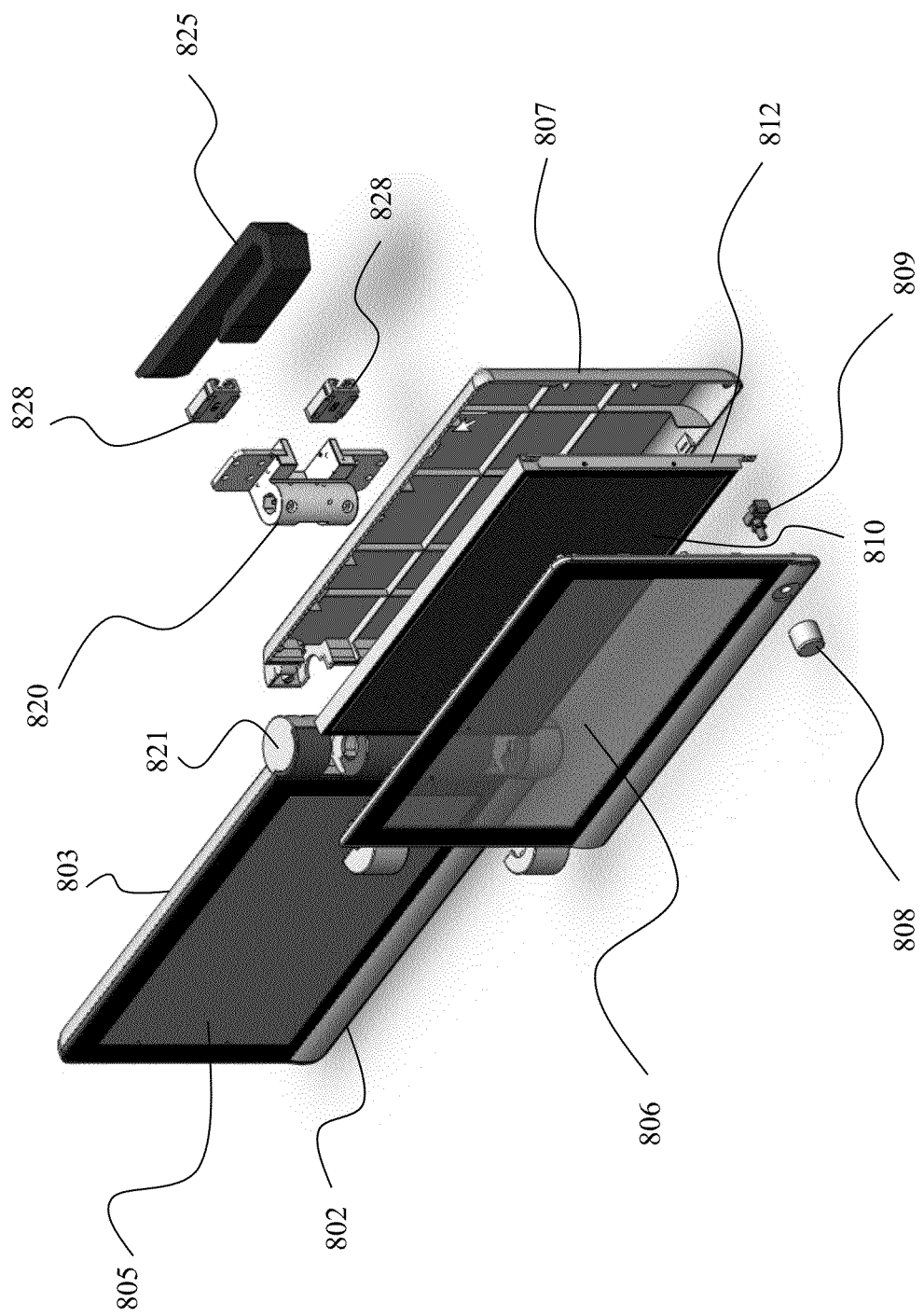
FIG. 8 is an expanded view illustration of one embodiment of two displays with their respective display enclosures and mounting assemblage.

FIG. 8 is an expanded view illustration of one embodiment of two displays 805, 810 with their respective display enclosures and mounting assemblage. In one embodiment, the displays are 15 inch touchscreen liquid crystal displays (LCDs). In one embodiment, the left display 805, when facing the front of the anesthesia workstation, displays patient monitoring information and is enclosed within a front patient display cover 802 and a rear patient display cover 803. In one embodiment, the right display 810, when facing the front of the anesthesia workstation, displays ventilator and anesthesia machine monitoring information and is enclosed within a front ventilator display cover 806 and a rear ventilator display cover 807. In one embodiment, the information presented on the displays is interchangeable between the two displays. In one embodiment, a vent knob 808 is set into the lower right corner of the front ventilator display cover 806 and controls a ventilator encoder switch 809, which is enclosed with the right display 810 within the enclosure formed by the front ventilator display cover 806 and rear ventilator display cover 807. Dialing of the vent knob 808 controls the ventilator encoder switch 806 and allows fine adjustments to settings on the ventilator than can be difficult to achieve via the touchscreen. The display enclosures act to both protect each display from liquids or objects and assist in mounting the displays to the remainder of the sliding track system.

In one embodiment, the front and rear display covers snap together around each display and hold the displays firmly in place. In the center space between the two displays, the ends of the front and rear display covers extend beyond the edges of the displays and bulge outward in a semi-circular manner such that, when snapped together, said extended ends of the front and rear display covers form a column-shaped pivoting mechanism enclosure 821. The pivoting mechanism enclosure 821 acts to connect the two display enclosures together in a central location, contains the components that allow for pivoting of each display, and attaches to the pivoting frame assembly 820, which in turn connects either to the display rails, via a pair of slider carriages 828, or to the locating brackets. In one embodiment, each display includes a side frame 812 (only shown on right display 810 in FIG. 8). Screws are inserted through the display enclosures and into the side frames 812 to lend additional stability to each display enclosure assembly. In one embodiment, a cable carrier 825 attaches to the pivoting frame assembly 820 and helps to prevent power, video, and other cables from being entangled within the sliding track system during sliding movements.

Figure 9B:
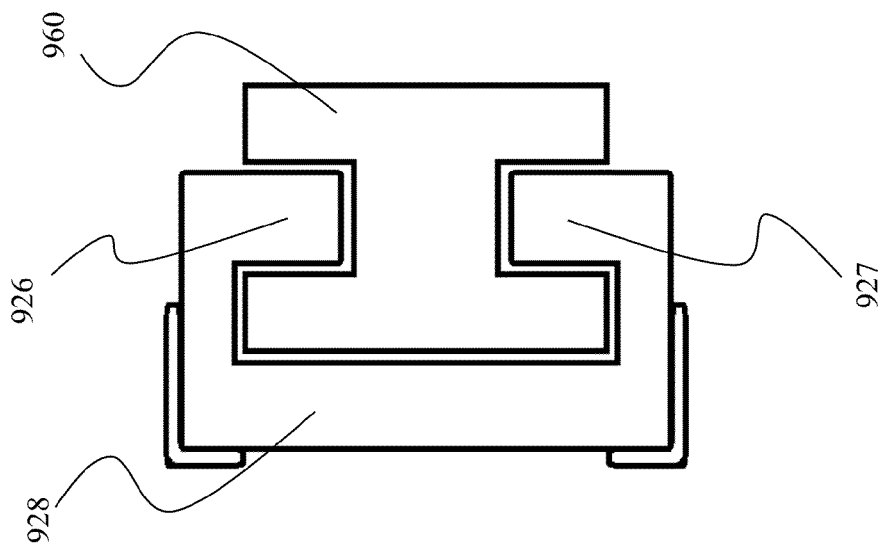
FIG. 9B is an enlarged side view illustration of one embodiment of a display rail and a mounted slider carriage.
Figure 9A:
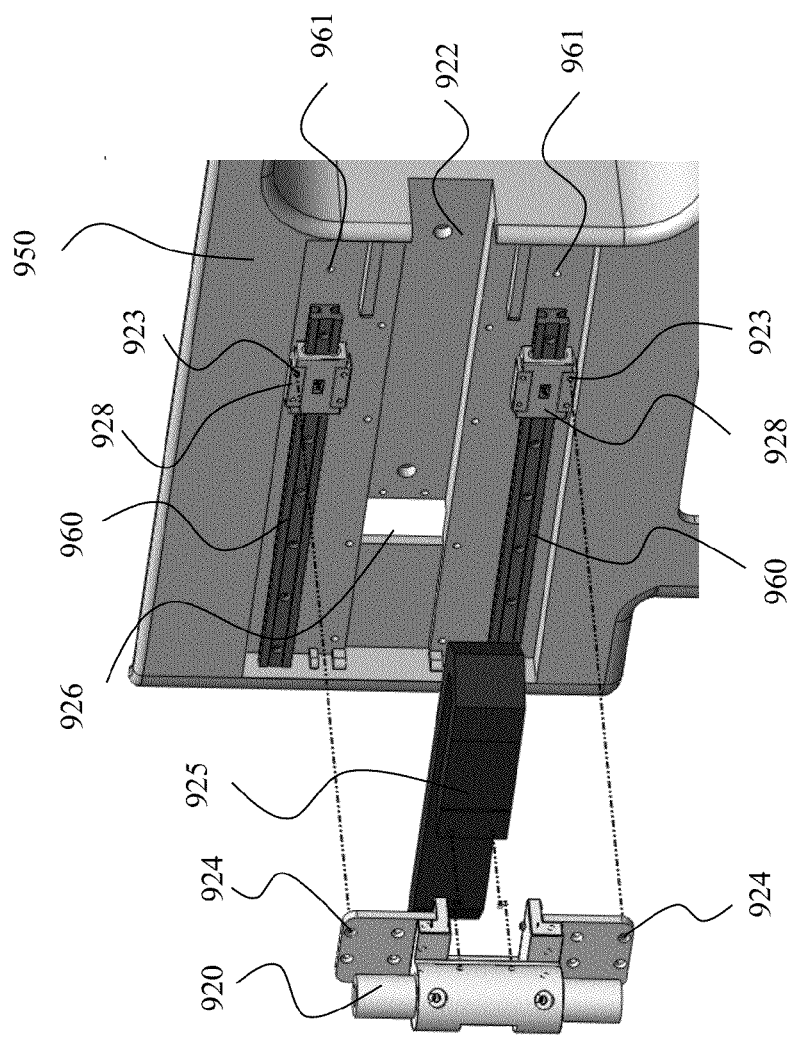
FIG. 9A is an expanded, oblique front view illustration of one embodiment of the front cover of an anesthesia workstation with mounted display rails and slider carriages, depicting a pivoting cable assembly and cable carrier.

FIG. 9A is an expanded, oblique front view illustration of one embodiment of the front cover 950 of an anesthesia workstation with mounted display rails 960 and slider carriages 928, depicting a pivoting cable assembly 920 and cable carrier 925. The pivoting cable assembly 920 and cable carrier 925 are removed to enhance visualization of the display rails 960 and slider carriages 928. FIG. 9B is an enlarged right side view illustration of one embodiment of a display rail 960 and a mounted slider carriage 928. In the view depicted in FIG. 9B, the display rail 960 is more proximate, and would be mounted to, the front cover (not shown) of the anesthesia workstation and the slider carriage 928 is more proximate, and would be mounted to, the pivoting frame assembly (not shown). Each slider carriage 928 is formed in a C shape when viewed from right side, as depicted in FIG. 9B. Two small lips 926, 927 are positioned at the top and bottom of the right open side of each C-shaped slider carriage 928. The top lip 926 fits into the rectangular shaped depression on the top side of each display rail 960 while the bottom lip 927 fits into the rectangular shaped depression on the bottom side of each display rail 960. Placement of these lips 926, 927 into the depressions on the display rail 960 both mounts the displays onto the front cover of the anesthesia workstation and allows for horizontal sliding of the displays along the front face of said workstation.

Referring back to FIG. 9A, the left closed side, opposite the right open side, of each C-shaped slider carriage contains mounting holes 923 for mounting to the pivoting frame assembly 920. The mounting holes 923 on the slider carriage 928 match up with mounting holes 924 on the top and bottom ends of the pivoting frame assembly 920, enabling, via the use of screws, attachment of one slider carriage 928 to the top end of the pivoting frame assembly 920 and one slider carriage 928 to the bottom end of the pivoting frame assembly 920. Also depicted is a cable carrier 925 which attaches to the central portion of the pivoting frame assembly 920. The cable carrier 925 helps prevent cables coming from the displays from being entangled within the sliding track system by sliding said cables along with the assembly and keeping them from coming into contact with the rails 960 or slider carriages 928. In one embodiment, a rectangular shaped channel 922 is formed within the front cover 950 and houses the cable carrier 925 as it slides along with the remainder of the assembly. In one embodiment, a rectangular shaped opening 926 is cut into the channel 922 to allow passage of the display cables.

In one embodiment, mounting of the displays to the anesthesia workstation is accomplished via the following steps. Display rails 960 are mounted to front cover 950 with their left ends, when facing the front of said anesthesia workstation, abutting an inside edge of said front cover 950. The slider carriages 928 are attached to a previously combined assembly (not shown) comprising the displays, display enclosures with pivoting mechanism enclosure, pivoting frame assembly, and cable carrier. This entire assembly is then mounted to the anesthesia workstation by sliding the slider carriages onto the display rails 960 from the right ends of said display rails 960, when facing the front of the anesthesia workstation. Once this assembly is mounted onto the rails 960, it is slid to its leftmost position and the right display is pivoted outward, revealing mounting holes 961 proximate said right ends of said display rails 960. Two stopper blocks (not shown) are mounted to the front cover 950 via screws inserted through said stopper blocks and into the mounting holes 961. Horizontal sliding is then limited leftward by the inside edge of the front cover 950 and rightward by the mounted stopper blocks.

Figure 9D:
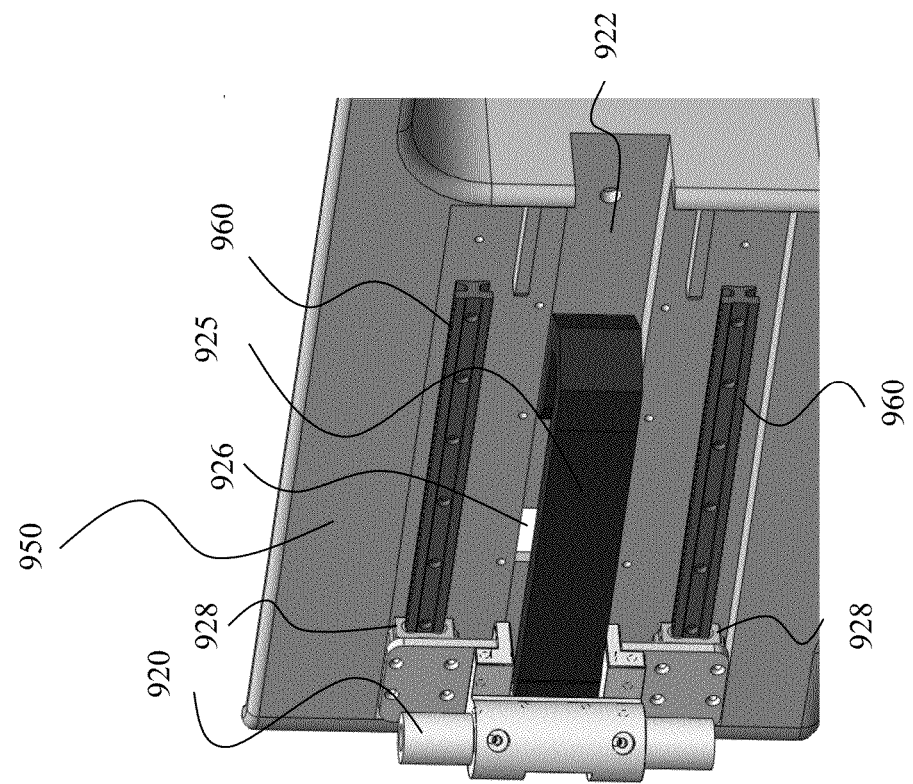
FIG. 9D is an oblique, front view illustration of the same embodiment of the front cover of an anesthesia workstation of FIG. 9C, depicting the pivoting frame assembly of the sliding track system slid to its leftmost position.
Figure 9C:
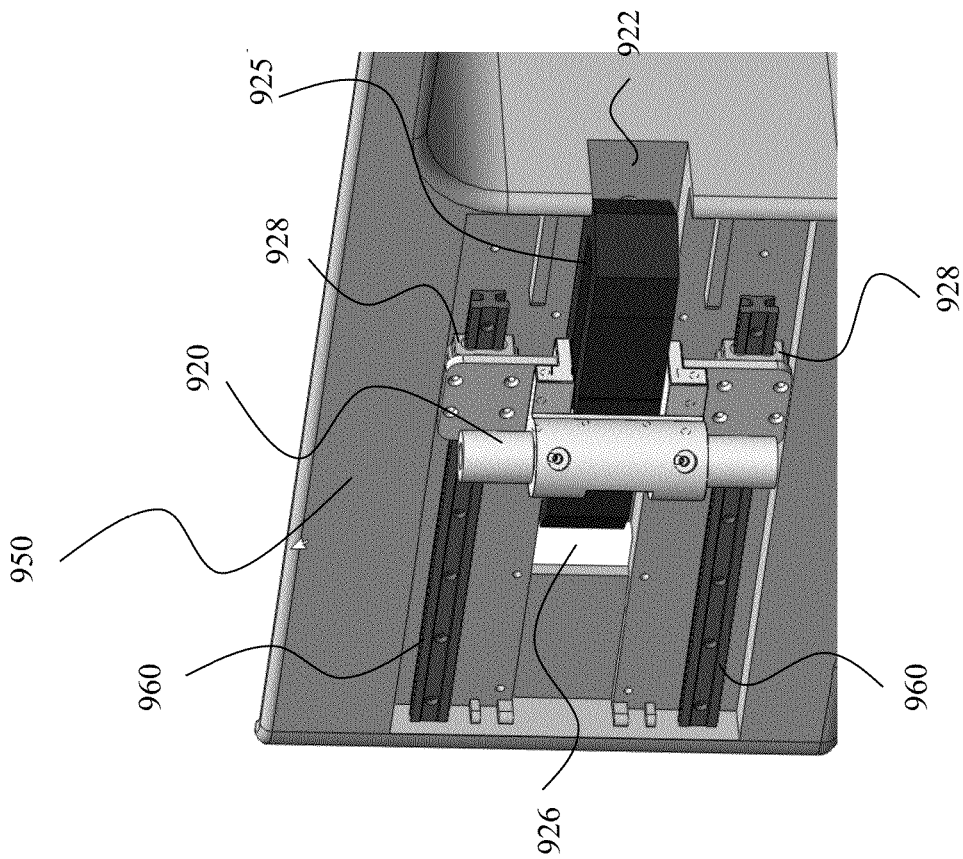
FIG. 9C is an oblique, front view illustration of one embodiment of the front cover of an anesthesia workstation, depicting the pivoting frame assembly of the sliding track system slid to its rightmost position.

FIG. 9C is an oblique, front view illustration of one embodiment of the front cover 950 of an anesthesia workstation, depicting the pivoting frame assembly 920 of the sliding track system slid along display rails 960 to its rightmost position while FIG. 9D is an oblique, front view illustration of the same embodiment of the front cover 950 of an anesthesia workstation, depicting the pivoting frame assembly 920 of the sliding track system slid along display rails 960 to its leftmost position. Displays are removed to enhance visualization. Also depicted are slider carriages 928, cable carrier 925, channel 922, and cable passage opening 926.

Figure 10:
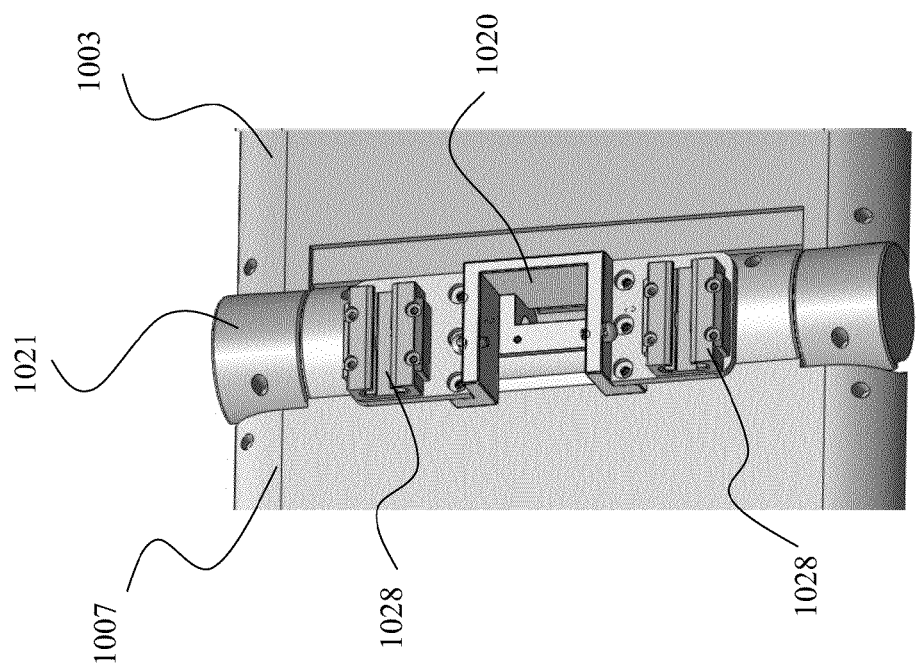
FIG. 10 is an oblique, rear view illustration of one embodiment of the display enclosures with central pivoting mechanism enclosure, depicting an attached pivoting frame assembly.

FIG. 10 is an oblique, rear view illustration of one embodiment of an assembly of the rear covers 1003, 1007 of the display enclosures with central pivoting mechanism enclosure 1021, depicting an attached pivoting frame assembly 1020. Attached to the pivoting frame mechanism 1020 are two slider carriages 1028. In this configuration, the assembly is ready for mounting to display rails secured to the front cover of an anesthesia workstation.

Figure 11B:
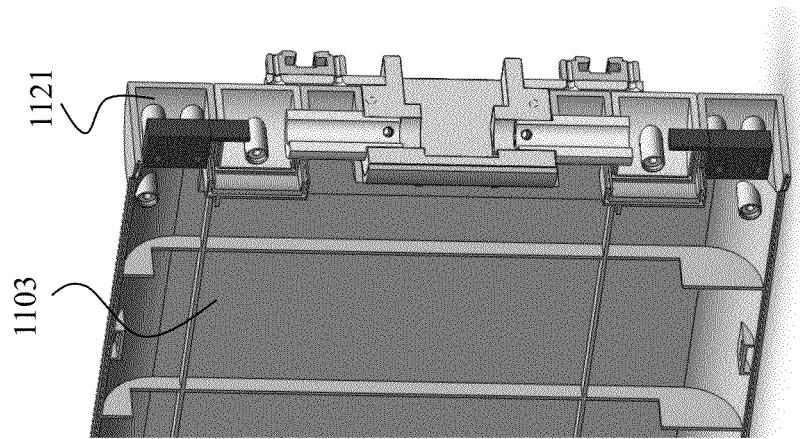
FIG. 11B is an oblique, front view illustration of one embodiment of the rear display cover of a left display enclosure, depicting a cross-sectional view of the pivoting mechanism enclosure.
Figure 11A:
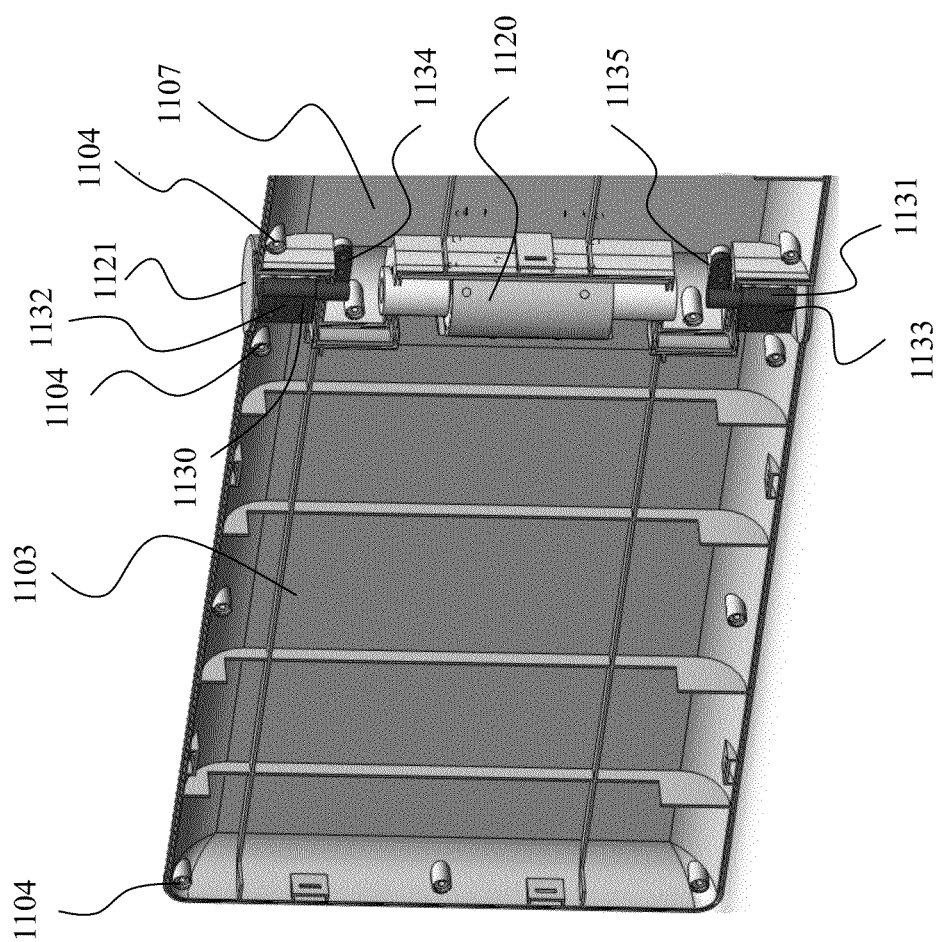
FIG. 11A is an oblique, front view illustration of one embodiment of the rear display cover of a left display enclosure, depicting the pivoting mechanism enclosure and the rear display cover of a right display enclosure.

FIG. 11A is an oblique, front view illustration of one embodiment of the rear display cover 1103 of a left display enclosure, depicting a pivoting mechanism enclosure 1121 and the rear display cover 1107 of a right display enclosure. Also depicted is a pivoting frame assembly 1120, which has been placed within the pivoting mechanism enclosure 1121 as the two rear covers 1103, 1107 were joined together. In one embodiment, each rear display cover 1103, 1107 includes small holes 1104 which receive small pegs (not shown) from the front display covers (not shown) when the two sets of covers are snapped together. In various embodiments, other fixing means are used to connect the two sets of display covers. Once the displays (not shown) have been seated into the rear display covers 1103, 1107 and front display covers (not shown) are snapped into place, the pivoting frame assembly 1120 will become compartmentalized within the pivoting mechanism enclosure 1121.

In one embodiment, the pivoting mechanism enclosure 1121 contains a first hinge 1130 comprising a wide rectangular shaped upper portion 1132 and a narrow rectangular shaped lower portion 1134, wherein said first hinge 1130 is positioned proximate the top of said pivoting mechanism enclosure 1121. The wide rectangular shaped upper portion 1132 is fixed to the rear display cover 1103 of the left display enclosure via two screws and the narrow rectangular shaped lower portion 1134 is fixed to the rear display cover 1107 of the right display enclosure via two screws. The pivoting mechanism enclosure 1121 also contains a second hinge 1131 comprising a wide rectangular shaped lower portion 1133 and a narrow rectangular shaped upper portion 1135, wherein said second hinge 1130 is positioned proximate the bottom of said pivoting mechanism enclosure 1121. The wide rectangular shaped lower portion 1133 is fixed to the rear display cover

1103 of the left display enclosure via two screws and the narrow rectangular shaped upper portion 1135 is fixed to the rear display cover 1107 of the right display enclosure via two screws. In one embodiment, the hinges are rotatable about the central axis of the pivoting mechanism enclosure, thereby allowing pivoting of the attached display enclosures. Once mounted, the display enclosure assembly is only pivotable outward and away from the front face of the anesthesia workstation, as the front cover of the anesthesia workstation prevents pivoting inward toward said anesthesia workstation.

FIG. 11B is an oblique, front view illustration of one embodiment of the rear display cover 1103 of a left display enclosure, depicting a cross-sectional view of the pivoting mechanism enclosure 1121.

Figure 11C:
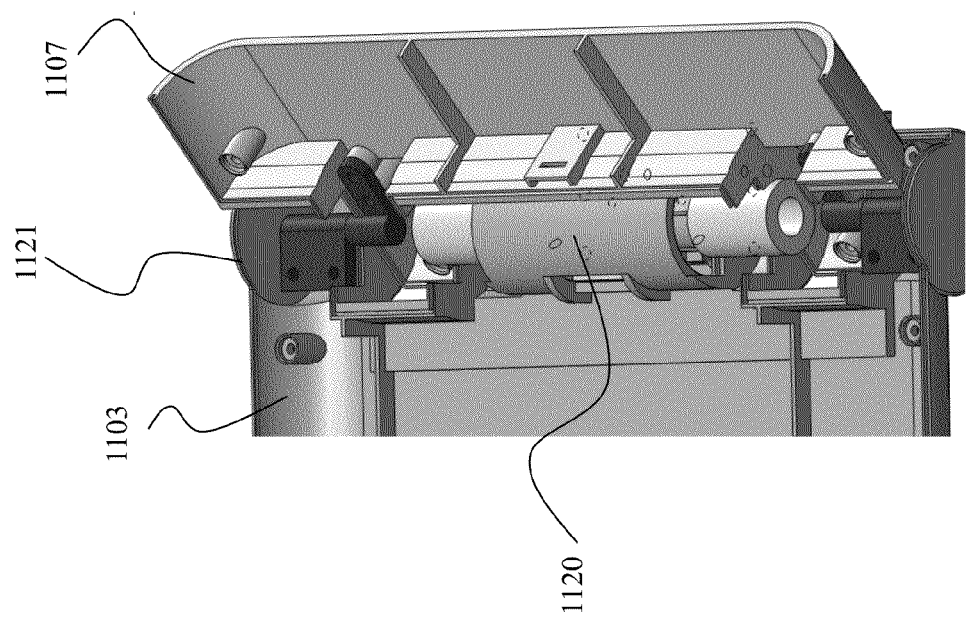
FIG. 11C is an oblique, front view illustration of one embodiment of the rear display cover of a left display enclosure and exposed pivoting mechanism enclosure, depicting the rear display cover of a right display enclosure pivoted at an angle of 45 degrees outward away from the front face of an anesthesia workstation.

FIG. 11C is an oblique, front view illustration of one embodiment of the rear display cover 1103 of a left display enclosure and exposed pivoting mechanism enclosure 1121, depicting the rear display cover 1107 of a right display enclosure pivoted at an angle of 45 degrees outward away from the front face of an anesthesia workstation. Also depicted is the pivoting frame assembly 1120 positioned within the pivoting mechanism enclosure 1121.

Figures 12A, 12B, 12C:
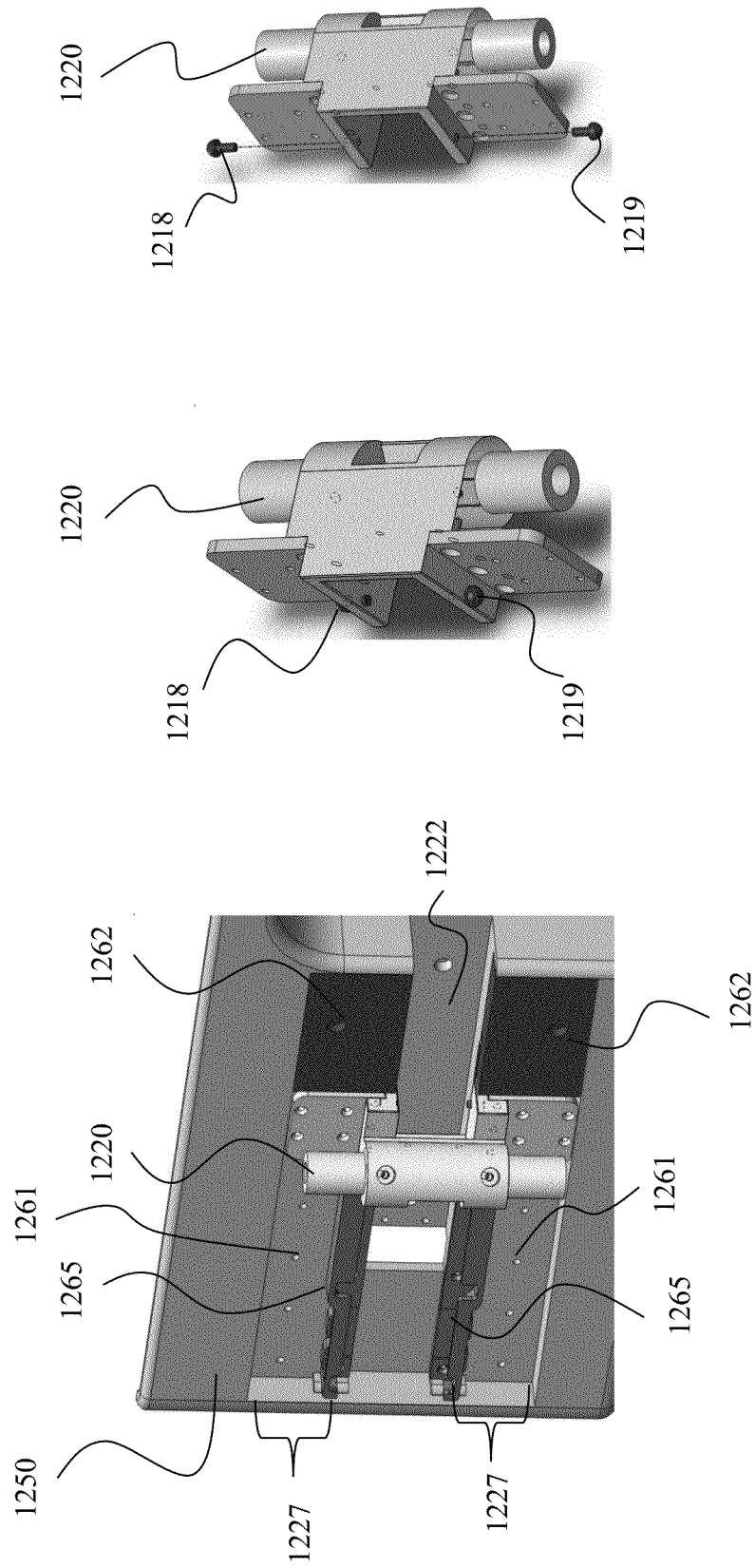
FIG. 12A is an oblique, front view illustration of one embodiment of the front of an anesthesia workstation, depicting the pivoting frame assembly and locating brackets of the sliding track system, with optional stopper blocks mounted to the front of the anesthesia workstation.
FIG. 12B is an oblique, left side view illustration of one embodiment of a pivoting frame assembly, depicting upper and lower locating pins inserted into the pivoting frame assembly.
FIG. 12C is an oblique, left side view illustration of one embodiment of a pivoting frame assembly, depicting upper and lower locating pins removed from the pivoting frame assembly.

FIG. 12A is an oblique, front view illustration of one embodiment of the front cover 1250 of an anesthesia workstation, depicting the pivoting frame assembly 1220 and locating brackets 1265 of the sliding track system, with stopper blocks 1262 mounted to the front cover 1250 of the anesthesia workstation. In this embodiment, locating brackets 1265 are used instead of display rails for enabling sliding of the display enclosures. As depicted in FIG. 12A, the mounting locations for the locating brackets 1265 are more proximate the rectangular shaped channel 1222 than the mounting locations for the display rails, as evidenced by the position of the display rail mounting holes 1261.

When using the locating brackets 1265 to enable horizontal sliding of the display enclosures, the slider carriages are not required. The upper and lower ends of the pivoting frame assembly 1220 fit into and, are horizontally slidable within, two additional rectangular shaped channels 1227 formed in the front cover 1250 by the installation of the locating brackets 1265. In addition, a central portion of the pivoting frame assembly fits into and, is horizontally slidable within, the center channel 1222 of the front cover 1250.

In one embodiment, when using the locating brackets 1265 rather than the display rails, mounting of the displays to the anesthesia workstation is accomplished via the following steps. Locating brackets 1265 are mounted to front cover 1250 with their left ends, when facing the front of said anesthesia workstation, abutting an inside edge of said front cover 1250. A previously combined assembly (not shown) comprising the displays, display enclosures with pivoting mechanism enclosure, and pivoting frame assembly is then mounted onto the anesthesia workstation by sliding the pivoting frame assembly into the channels 1222, 1227 from the right ends of said locating brackets 1265, when facing the front of the anesthesia workstation. Once this assembly is mounted into the channels 1222, 1227, it is slid to its leftmost position and the right display is pivoted outward, revealing mounting holes proximate said right ends of said locating brackets 1265. Two stopper blocks 1262 are mounted to the front cover 1250 via screws inserted through said stopper blocks 1262 and into the mounting holes. Horizontal sliding is then limited leftward by the inside edge of the front cover 1250 and rightward by the mounted stopper blocks 1262.

FIG. 12B is an oblique, left side view illustration of one embodiment of a pivoting frame assembly 1220, depicting upper and lower locating pins 1218, 1219 inserted into the pivoting frame assembly 1220. In one embodiment, the locating pins 1218, 1219 interact with the locating brackets to securely hold the display enclosures in place and prevent them from sliding horizontally. Meanwhile, pivoting action of both display enclosures is still possible.

FIG. 12C is an oblique, left side view illustration of one embodiment of a pivoting frame assembly 1220, depicting upper and lower locating pins 1218, 1219 removed from the pivoting frame assembly 1220.

Figure 12D:
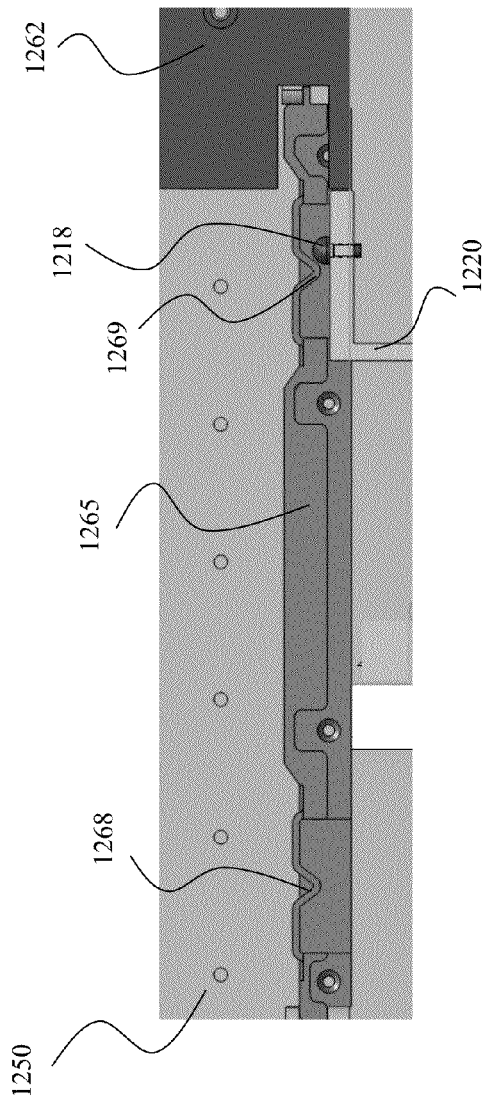
FIG. 12D is a front view illustration of one embodiment of the front of an anesthesia workstation and a locating bracket of the sliding track system, depicting a pivoting frame assembly with inserted upper locating pin, slid to the rightmost position.

FIG. 12D is a front view illustration of one embodiment of the front cover 1250 of an anesthesia workstation and a locating bracket 1265 of the sliding track system, depicting a pivoting frame assembly 1220 with inserted upper locating pin 1218, slid to the rightmost position. In one embodiment, the locating bracket 1265 contains a first elastic protrusion 1268 proximate its left end and a second elastic protrusion 1269 proximate its right end. As the pivoting frame assembly 1220 is slid to its rightmost position, the upper locating pin 1218 pushes up on the second elastic protrusion 1269. The locating pin 1218 then slides past the second elastic protrusion 1269 and the right edge of the pivoting frame assembly 1220 abuts the left edge of the stopper block 1262. Once the locating pin 1218 has passed by, the second elastic protrusion 1269 returns to its original position. Since a specific amount of force is required to push the locating pin 1218 past the second elastic protrusion 1269 in either direction, the pivoting frame assembly 1220 and attached display enclosures become temporarily fixed when the pivoting frame assembly 1220 is slid to its rightmost position and the locating pin 1218 is positioned between the elastic protrusion 1269 and the stopper block 1262. Though not shown in FIG. 12D, a lower locating bracket interacts similarly with a locating pin in a vertically flipped arrangement to assist in holding the display enclosures in the rightmost position.

Figure 12E:
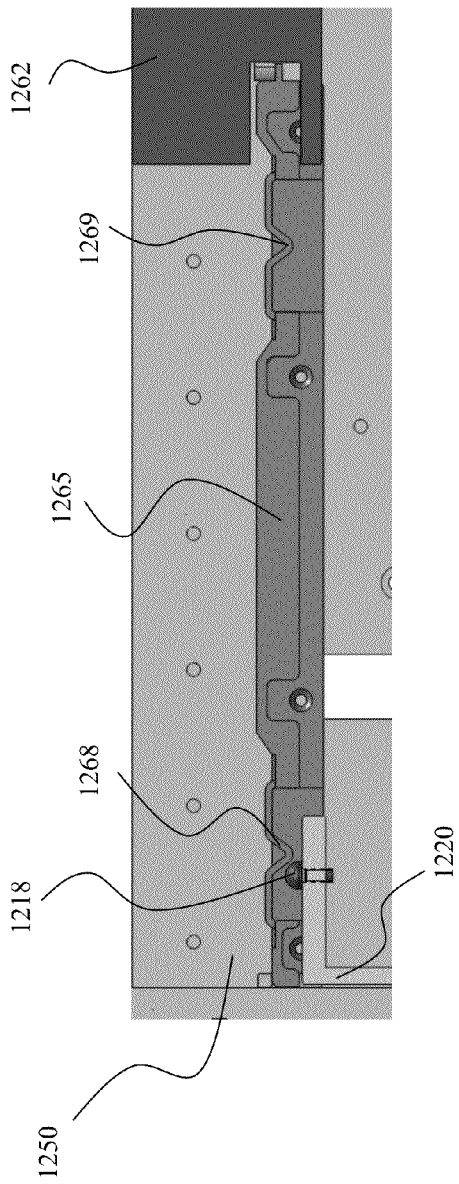
FIG. 12E is a front view illustration of one embodiment of the front of an anesthesia workstation and a locating bracket of the sliding track system, depicting a pivoting frame assembly with inserted upper locating pin, slid to the leftmost position.

FIG. 12E is a front view illustration of one embodiment of the front cover 1250 of an anesthesia workstation and a locating bracket 1265 of the sliding track system, depicting a pivoting frame assembly 1220 with inserted upper locating pin 1218, slid to the leftmost position. The pivoting frame assembly 1220 and attached display enclosures become temporarily fixed in the leftmost position in a manner nearly similar to that described above for the rightmost position. The pivoting frame assembly 1220 is held in the leftmost position when the locating pin 1218 is positioned between the first elastic protrusion 1268 and an inside edge of the front cover 1250. Though not shown in FIG. 12E, a lower locating bracket interacts similarly with a locating pin in a vertically flipped arrangement to assist in holding the display enclosures in the leftmost position. Pivoting of both displays either independently or simultaneously is still possible when the assembly has been fixed in either its leftmost or rightmost position.

Figure 13:
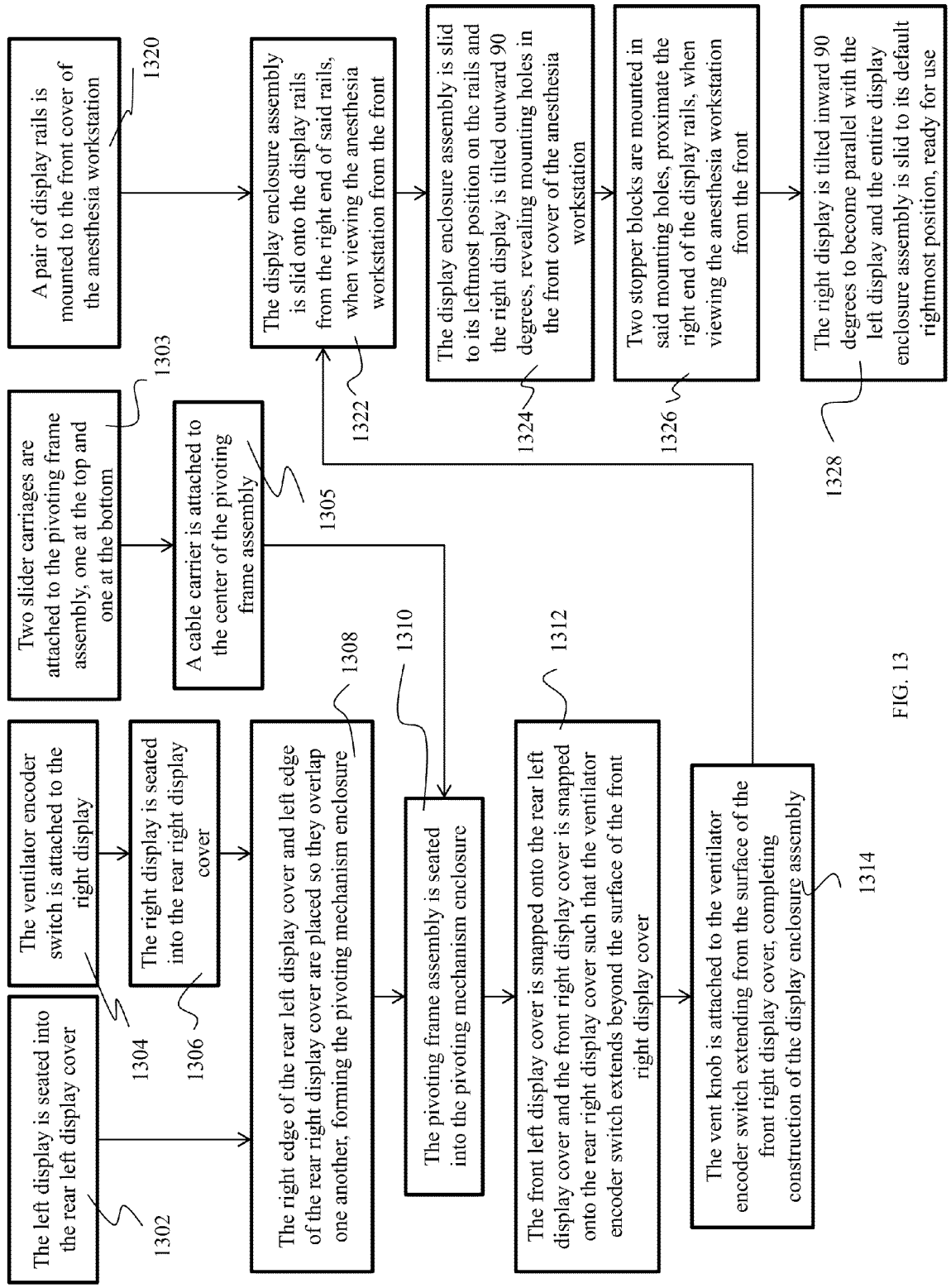
FIG. 13 is a flow chart outlining one embodiment of the steps necessary to assemble and mount a sliding track system when display rails are used.

FIG. 13 is a flow chart outlining one embodiment of the steps necessary to assemble and mount a sliding track system when display rails are used. In step 1302, the left display is seated into the rear left display cover. Meanwhile, in step 1304, the ventilator encoder switch is attached to the right display. Then, in step 1306, the right display is seated into the rear right display cover. Once both displays are seated in their respective covers, the right edge of the rear left display cover and left edge of the rear right display cover are placed so they overlap one another, forming the pivoting mechanism enclosure, in step 1308.

Meanwhile, in step 1303, two slider carriages are attached to the pivoting frame assembly, one at the top and one at the bottom. In step 1305, a cable carrier is attached to the center of the pivoting frame assembly. Then, in step 1310, the pivoting frame assembly is seated into the pivoting mechanism enclosure formed in step 1308. Next, in step 1312, the front left display cover is snapped onto the rear left display cover and the front right display cover is snapped onto the rear right display cover, such that the ventilator encoder switch extends beyond the surface of the front right display cover. The vent knob is then attached to the ventilator encoder switch extending from the surface of the front right display cover in step 1314, completing construction of the display enclosure assembly.

In step 1320, a pair of display rails is mounted to the front cover of the anesthesia workstation. Then, in step 1322, the display enclosure assembly completed in step 1314 is slid onto the display rails from the right end of said rails, when viewing the anesthesia workstation from the front. Next, in step 1324, the display enclosure assembly is slid to its leftmost position on the rails and the right display is tilted outward 90 degrees, revealing mounting holes in the front cover of the anesthesia workstation. Two stopper blocks are mounted in said mounting holes in step 1326, proximate the right end of the display rails, when viewing the anesthesia workstation from the front. Finally, in step 1328, the right display is tilted inward 90 degrees to become parallel with the left display and the entire display enclosure assembly is slid to its default rightmost position, ready for use.

Figure 14:
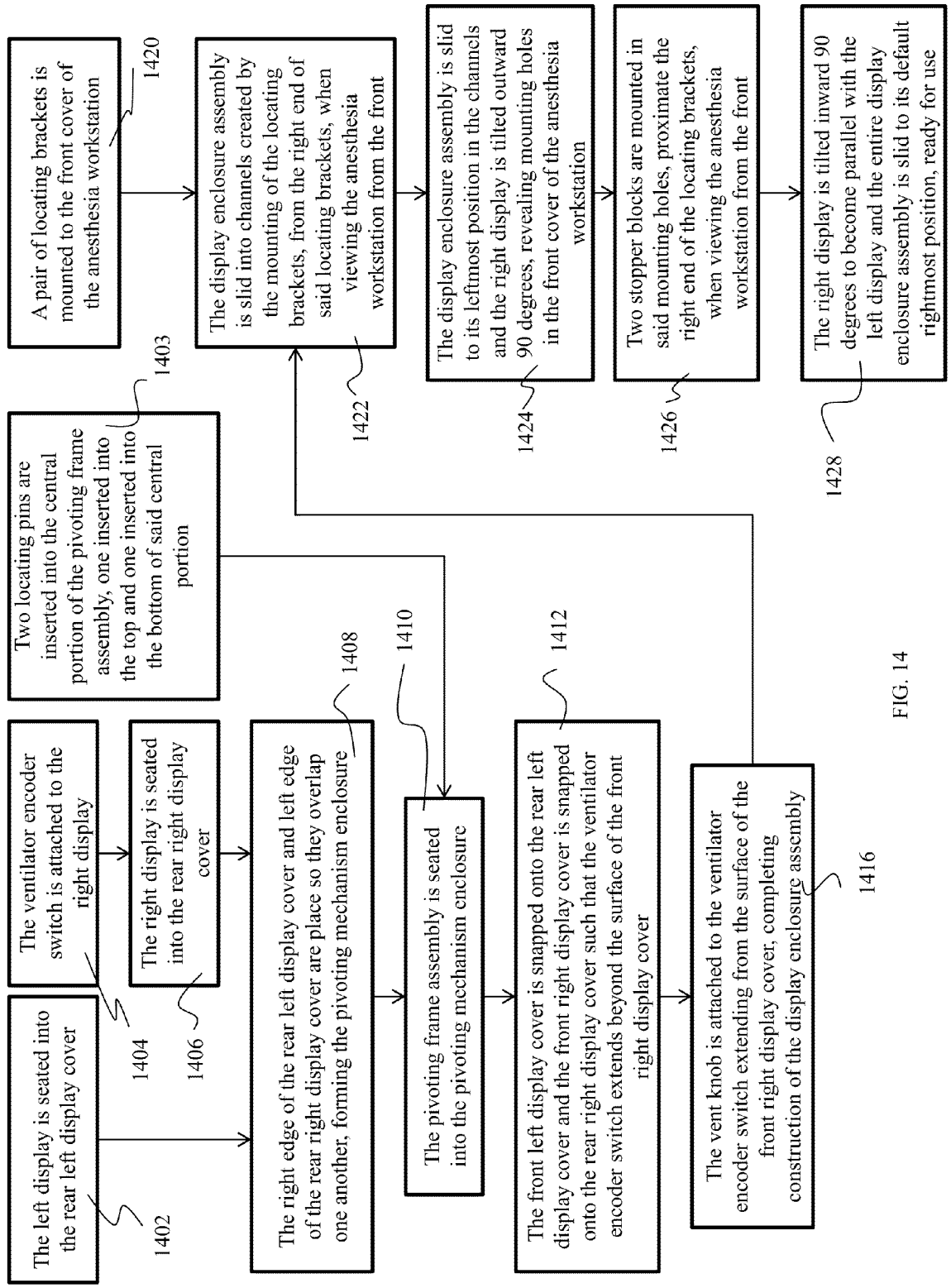
FIG. 14 is a flow chart outlining one embodiment of the steps necessary to assemble and mount a sliding track system when locating brackets are used.

FIG. 14 is a flow chart outlining one embodiment of the steps necessary to assemble and mount a sliding track system when locating brackets are used. In step 1402, the left display is seated into the rear left display cover. Meanwhile, in step 1404, the ventilator encoder switch is attached to the right display. Then, in step 1406, the right display is seated into the rear right display cover. Once both displays are seated in their respective covers, the right edge of the rear left display cover and left edge of the rear right display cover are placed so they overlap one another, forming the pivoting mechanism enclosure, in step 1408.

Meanwhile, in step 1403, two locating pins are inserted into the central portion of the pivoting frame assembly, one inserted into the top and one inserted into the bottom of said central portion. Then, in step 1410, the pivoting frame assembly is seated into the pivoting mechanism enclosure formed in step 1408. Next, in step 1412, the front left display cover is snapped onto the rear left display cover and the front right display cover is snapped onto the rear right display cover, such that the ventilator encoder switch extends beyond the surface of the front right display cover. The vent knob is then attached to the ventilator encoder switch extending from the surface of the front right display cover in step 1414, completing construction of the display enclosure assembly.

In step 1420, a pair of locating brackets is mounted to the front cover of the anesthesia workstation. Then, in step 1422, the display enclosure assembly completed in step 1414 is slid into channels created by the mounting of the locating brackets, from the right end of said locating brackets, when viewing the anesthesia workstation from the front. Next, in step 1424, the display enclosure assembly is slid to its leftmost position in the channels and the right display is tilted outward 90 degrees, revealing mounting holes in the front cover of the anesthesia workstation. Two stopper blocks are mounted in said mounting holes in step 1426, proximate the right end of the locating brackets, when viewing the anesthesia workstation from the front. Finally, in step 1428, the right display is tilted inward 90 degrees to become parallel with the left display and the entire display enclosure assembly is slid to its default rightmost position, ready for use.

Figure 15B:
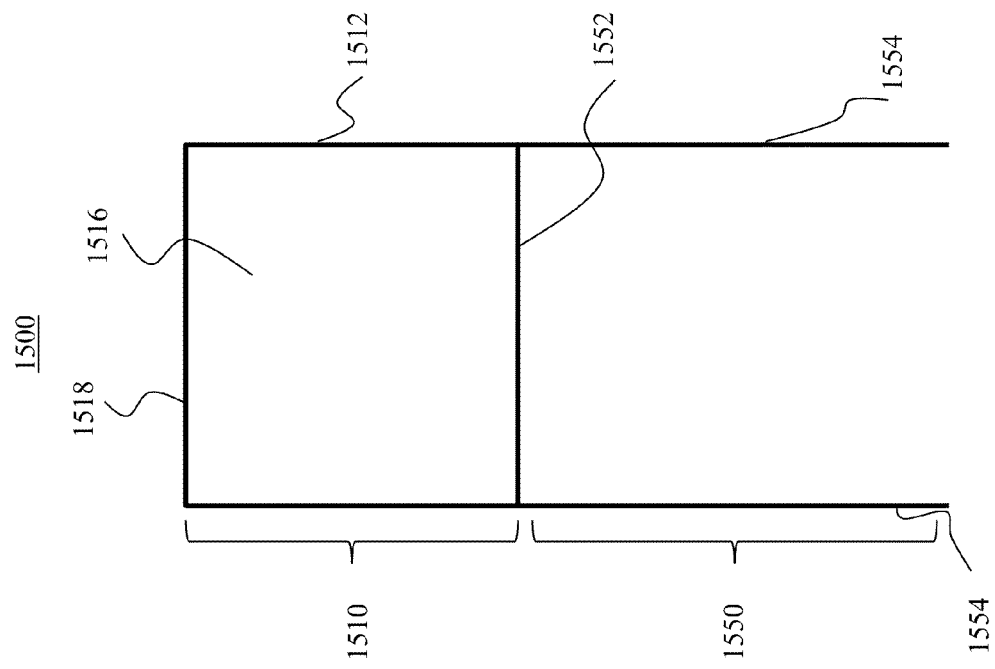
FIG. 15B is a right side view illustration of the same embodiment of a generic anesthesia workstation of FIG. 15A.
Figure 15A:
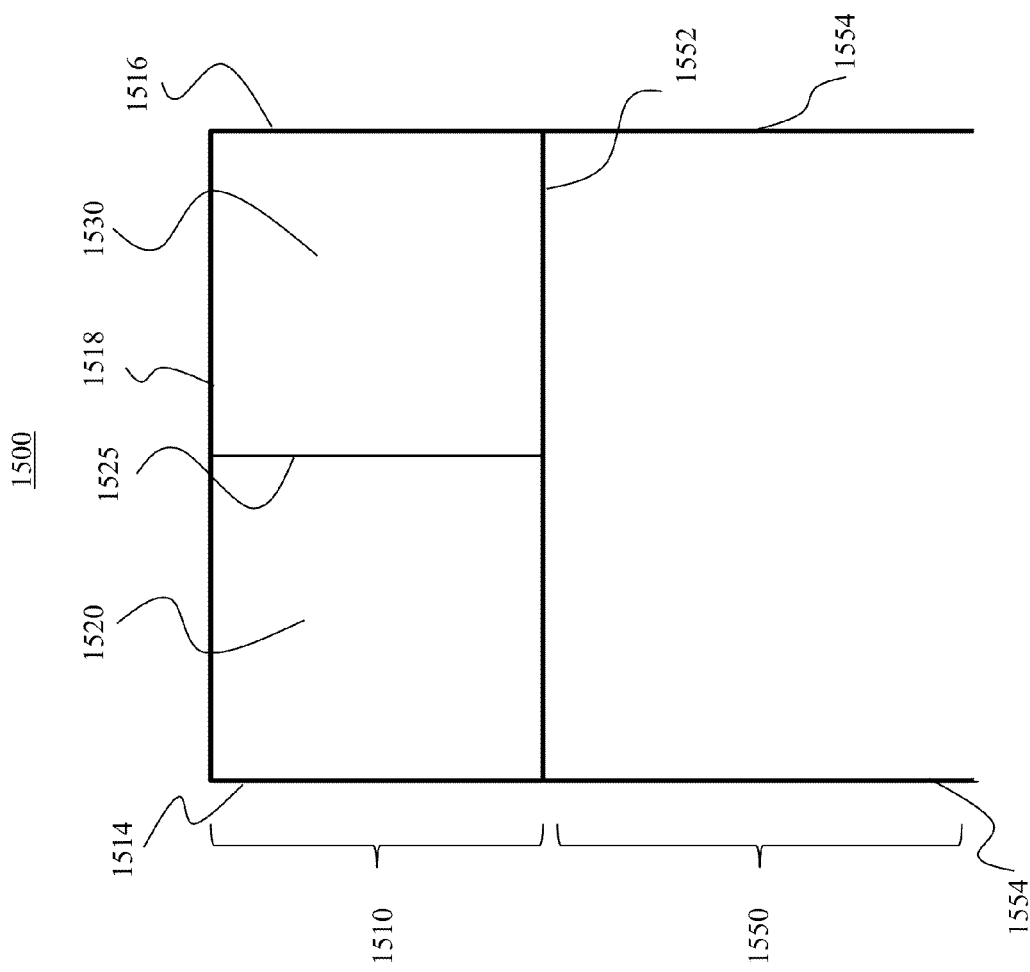
FIG. 15A is a front view illustration of one embodiment of a generic anesthesia workstation.

FIG. 15A is a front view illustration of one embodiment of a generic anesthesia workstation 1500 and FIG. 15B is a right side view illustration of the same embodiment of a generic anesthesia workstation 1500 of FIG. 15A. In one embodiment, the anesthesia workstation 1500 comprises a housing comprising a top portion 1510 and a bottom portion 1550. In one embodiment, the bottom portion 1550 comprises a horizontal planar surface 1552 and a plurality of vertical walls 1554 for supporting the horizontal planar surface 1552. In various embodiments, the horizontal planar surface 1552 is at a height from a range of two and a half feet to four feet from the ground. In one embodiment, the top portion 1510 comprises a vertical back wall 1512, a vertical left wall 1514, a vertical right wall 1516, and a horizontal top cover 1518, wherein said vertical back wall 1512, vertical left wall 1514, and horizontal top cover 1518 define a first compartment 1520 having an opening defined by four perimeter edges. In one embodiment, said vertical back wall 1512, vertical right wall 1516, and horizontal top cover 1518 define a second compartment 1530 having an opening defined by four perimeter edges. In one embodiment, the first compartment 1520 is separated from the second compartment 1530 by a wall 1525.

Figure 15D:
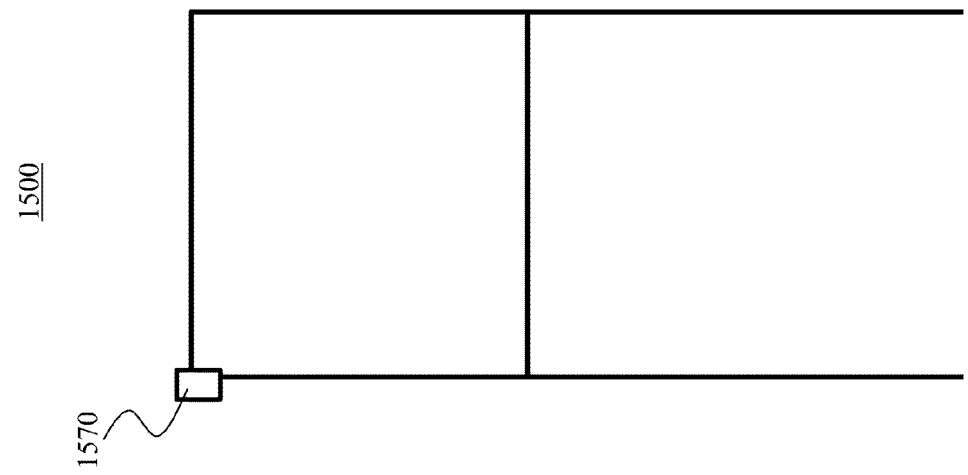
FIG. 15D is a right side view illustration of one embodiment of a sliding track system mounted on the generic anesthesia workstation of FIG. 15A.
Figure 15C:
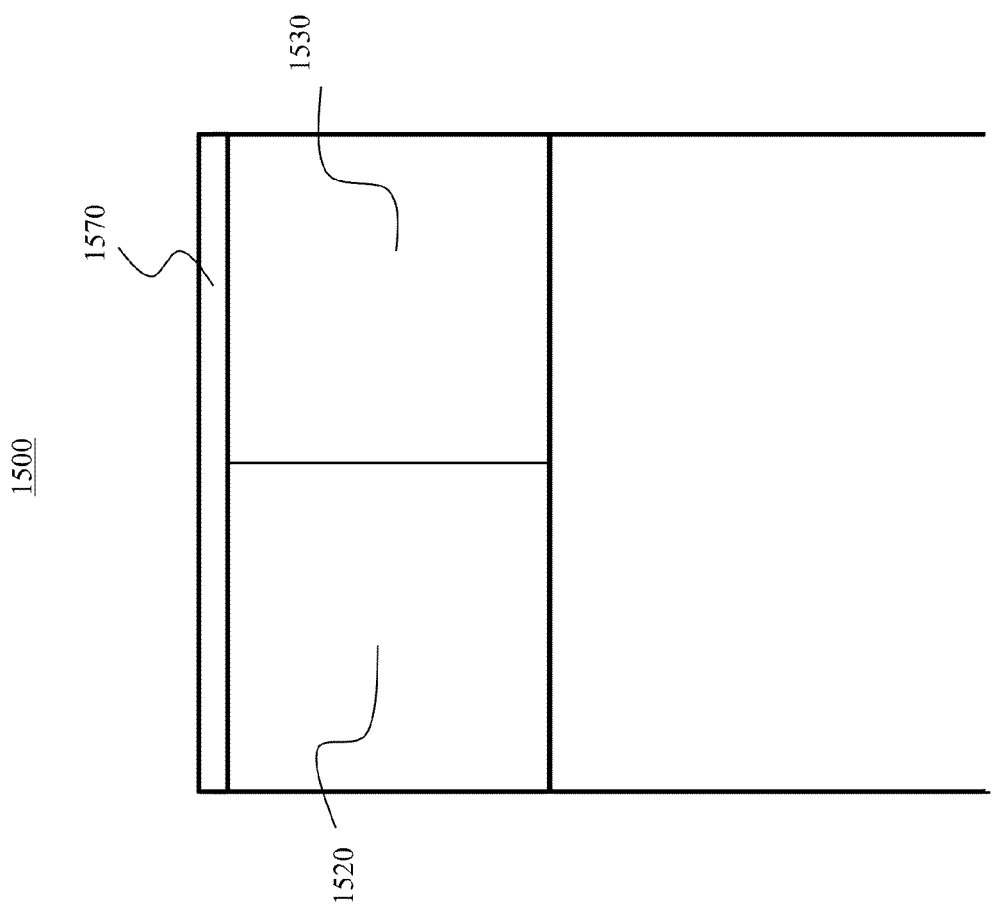
FIG. 15C is a front view illustration of one embodiment of a sliding track system mounted on the generic anesthesia workstation of FIG. 15A.

FIG. 15C is a front view illustration of one embodiment of a sliding track system mounted on the generic anesthesia workstation 1500 of FIG. 15A and FIG. 15D is a right side view illustration of one embodiment of a sliding track system mounted on a generic anesthesia workstation 1500 of FIG. 15A. In one embodiment, a horizontal sliding track 1570 is attached to the top perimeter edge of the first compartment 1520 and the top perimeter edge of the second compartment 1530. In one embodiment, the sliding track 1570 is a contiguous structure. In another embodiment, the sliding track 1570 is a discontinuous structure.

Figure 15F:
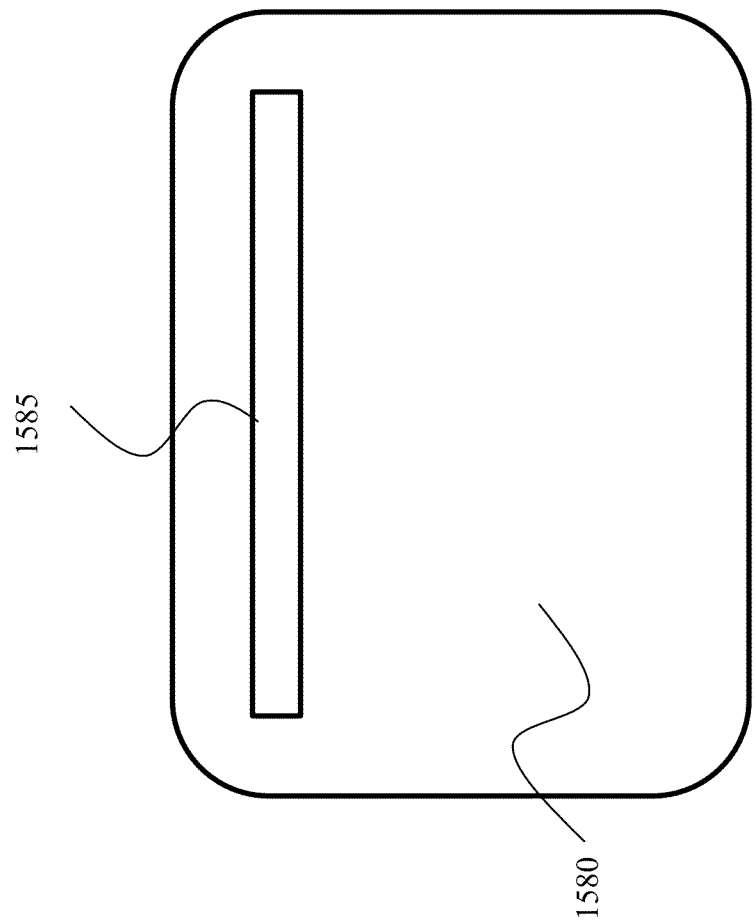
FIG. 15E is a front view illustration of one embodiment of a mounting bracket attached to the back of a display and adapted to slidably attach to the horizontal sliding track of FIG. 15C; and, FIG. 15F is a right side view illustration of one embodiment of a mounting bracket attached to the back of a display and adapted to slidably attach to the horizontal sliding track of FIG. 15C.
Figure 15E:
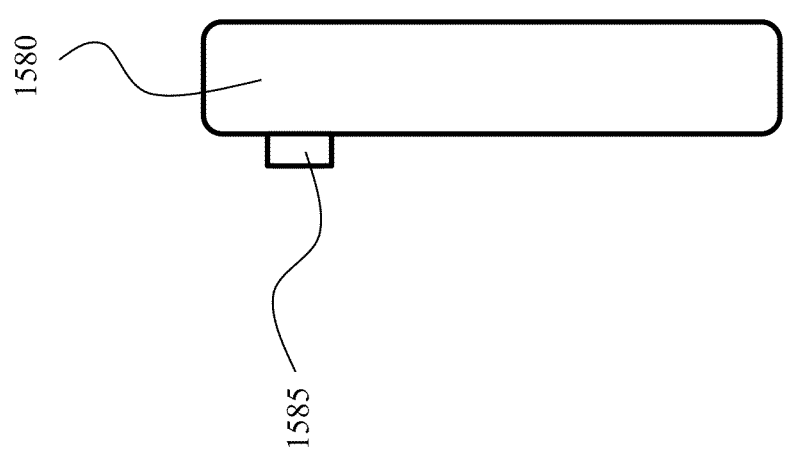

FIG. 15E is a front view illustration of one embodiment of a mounting bracket 1585 attached to the back of a display 1580 and adapted to slidably attach to the horizontal sliding track of FIG. 15C, and FIG. 15F is a right side view illustration of one embodiment of a mounting bracket 1585 attached to the back of a display 1580 and adapted to slidably attach to the horizontal sliding track of FIG. 15C. In one embodiment, the mounting bracket 1585 is horizontally slidable within said sliding track. Therefore, once mounted, the display 1580 is capable of horizontally sliding from a first position to a second position. In the first position, the display 1580 covers the first compartment opening.

In one embodiment, the display 1580 is also capable of pivoting while still remaining attached to the sliding track.

In another embodiment, a mounting bracket is attached to the back of a second display and adapted to slidably attach to the horizontal sliding track of FIG. 15C. The mounting bracket of the second display is horizontally slidable within said sliding track. In one embodiment, the second display is also capable of pivoting while still remaining attached to the sliding track.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An anesthesia workstation comprising:
   a lower portion and an upper portion, wherein said upper portion comprises a front face;
   a first display;
   a second display; and, a display positioning system comprising:
- a front cover for fixedly attaching to said front face of said anesthesia workstation, wherein said front cover comprises a left side and a right side, and wherein said left side comprises at least one mounting hole and at least one channel, and said right side comprises a recessed storage area; and,
- a sliding track and pivoting mounting assemblage, comprising:
  - a left display enclosure for housing said first display and comprising a left front cover and a left rear cover;
  - a right display enclosure for housing said second display and comprising a right front cover and a right rear cover, wherein, when said left front and left rear covers and said right front and right rear covers are assembled to form said left display enclosure and said right display enclosure respectively, a pivoting mechanism enclosure is formed, further wherein said pivoting mechanism enclosure is positioned between and connects said left and right display enclosures;
  - a pivoting frame assembly positioned within said pivoting mechanism enclosure and including at least one locating pin;
  - at least one cable carrier configured to attach to said pivoting frame assembly, slide within said at least one channel, and guide cables during movement of said display enclosures;
  - at least one locating bracket configured to slidably receive said pivoting frame assembly and comprising at least one elastic protrusion; and,
  - at least one stopper block;
  - wherein said at least one locating bracket is mounted to said front cover using said at least one mounting hole such that a left end of said at least one locating bracket abuts an inside edge of said front cover and a right end of at least one locating bracket is free of obstruction;
  - wherein said pivoting frame assembly is adapted to slide onto said at least one locating bracket from said unobstructed right end;
  - wherein said at least one stopper block is attached to said front cover proximate said unobstructed right end of said at least one locating bracket such that said pivoting frame assembly is unable to slide off to the right of said at least one locating bracket; and,
  - wherein said sliding track and pivoting mounting assemblage is horizontally slidable from a first slidable position to a second slidable position and is lockable in at least one locking position by using force to advance said at least one locating pin beyond said at least one elastic protrusion and wherein said pivoting mechanism enclosure further comprises pivoting means, wherein said pivoting means enable pivoting of a left side of said left display enclosure and a right side of said right display enclosure outwardly away from said front cover.

2. The anesthesia workstation of claim 1, wherein said sliding track and pivoting mounting assemblage, when in said first slidable position, is slid to its rightmost position along said at least one locating bracket.

3. The anesthesia workstation of claim 1, wherein said sliding track and pivoting mounting assemblage, when in said second slidable position, is slid to its leftmost position along said at least one locating bracket.

4. The anesthesia workstation of claim 1, wherein said sliding track and pivoting mounting assemblage is horizontally slidable within a range of 18 inches from said first slidable position to said second slidable position and any position therebetween.

5. The anesthesia workstation of claim 1, wherein said recessed storage area is rectangular in shape and exposed and accessible when said sliding track and pivoting mounting assemblage is slid to said second slidable position.

6. The anesthesia workstation of claim 1, wherein said left display enclosure is pivotable from a first left pivotable position to a second left pivotable position and any position therebetween, wherein said first left pivotable position is at 0 degrees and parallel to said front cover and said second left pivotable position is at 90 degrees, facing the right side of said front cover, and perpendicular to said front cover and said right display enclosure is pivotable from a first right pivotable position to a second right pivotable position and any position therebetween, wherein said first right pivotable position is at 0 degrees and parallel to said front cover and said second right pivotable position is at 90 degrees, facing the left side of said front cover, and perpendicular to said front cover.

7. The anesthesia workstation of claim 6, wherein said recessed storage area is exposed and accessible when said right display enclosure is pivoted to said second right pivotable position.

8. The anesthesia workstation of claim 1, wherein horizontal sliding of the sliding track and pivoting mounting assemblage and pivoting of the left and right display enclosures can be performed independently or simultaneously.

9. The anesthesia workstation of claim 1, wherein said at least one channel of said front cover includes at least one opening for routing of said cables.

10. The anesthesia workstation of claim 1, wherein said display positioning system further comprises a ventilator encoder switch attached to said second display and contained within said right display enclosure, wherein said right front cover of said right display enclosure includes a vent knob operably coupled to said ventilator encoder switch for adjustment of ventilator settings.

11. A display positioning system for an anesthesia workstation comprising:
- a front cover for fixedly attaching to a front face of said anesthesia workstation, wherein said front cover comprises a left side and a right side, and wherein said left side comprises at least one mounting hole and at least one channel, and said right side comprises a recessed storage area; and,
- a sliding track and pivoting mounting assemblage, comprising:
  - a left display enclosure for housing a first display and comprising a left front cover and a left rear cover;
  - a right display enclosure for housing a second display and comprising a right front cover and a right rear cover, wherein, when said left front and left rear covers and said right front and right rear covers are assembled to form said left display enclosure and said right display enclosure respectively, a pivoting mechanism enclosure is formed, further wherein said pivoting mechanism enclosure is positioned between and connects said left and right display enclosures;
  - a pivoting frame assembly positioned within said pivoting mechanism enclosure and including at least one locating pin;

at least one cable carrier configured to attach to said pivoting frame assembly, slide within said at least one channel, and guide cables during movement of said display enclosures;

at least one locating bracket configured to slidably receive said pivoting frame assembly and comprising at least one elastic protrusion; and, at least one stopper block;

wherein said at least one locating bracket is mounted to said front cover using said at least one mounting hole such that a left end of said at least one locating bracket abuts an inside edge of said front cover and a right end of at least one locating bracket is free of obstruction;

wherein said at pivoting frame assembly is adapted to slide onto said at least one locating bracket from said unobstructed right end;

wherein said at least one stopper block is attached to said front cover proximate said unobstructed right end of said at least one locating bracket such that said pivoting frame is unable to slide off to the right of said at least one locating bracket; and, wherein said sliding track and pivoting mounting assemblage is horizontally slidable from a first slidable position to a second slidable position and is lockable in at least one locking position by using force to advance said at least one locating pin beyond said at least one elastic protrusion and wherein said pivoting mechanism enclosure further comprises pivoting means, wherein said pivoting means enable pivoting of a left side of said left display enclosure and a right side of said right display enclosure outwardly away from said front cover.

12. The display positioning system of claim 11, wherein said sliding track and pivoting mounting assemblage, when in said first slidable position, is slid to its rightmost position along said at least one locating bracket.

13. The display positioning system of claim 11, wherein said sliding track and pivoting mounting assemblage, when in said second slidable position, is slid to its leftmost position along said at least one locating bracket.

14. The display positioning system of claim 11, wherein said sliding track and pivoting mounting assemblage is horizontally slidable within a range of 18 inches from said first slidable position to said second slidable position and any position therebetween.

15. The display positioning system of claim 11, wherein said recessed storage area is rectangular in shape and exposed and accessible when said sliding track and pivoting mounting assemblage is slid to said second slidable position.

16. The display positioning system of claim 11, wherein said left display enclosure is pivotable from a first left pivotable position to a second left pivotable position and any position therebetween, wherein said first left pivotable position is at 0 degrees and parallel to said front cover and said second left pivotable position is at 90 degrees, facing the right side of said front cover, and perpendicular to said front cover and said right display enclosure is pivotable from a first right pivotable position to a second right pivotable position and any position therebetween, wherein said first right pivotable position is at 0 degrees and parallel to said front cover and said second right pivotable position is at 90 degrees, facing the left side of said front cover, and perpendicular to said front cover.

17. The display positioning system of claim 16, wherein said recessed storage area is exposed and accessible when said right display enclosure is pivoted to said second right pivotable position.

18. The display positioning system of claim 11, wherein horizontal sliding of the sliding track and pivoting mounting assemblage and pivoting of the left and right display enclosures can be performed independently or simultaneously.

19. The display positioning system of claim 11, wherein said at least one channel of said front cover includes at least one opening for routing of said cables.

20. The display positioning system of claim 11, further comprising a ventilator encoder switch attached to said second display and contained within said right display enclosure, wherein said right front cover of said right display enclosure includes a vent knob operably coupled to said ventilator encoder switch for adjustment of ventilator settings.

* * * * *